US010911911B1

(12) United States Patent
Wang

(10) Patent No.: US 10,911,911 B1
(45) Date of Patent: Feb. 2, 2021

(54) DEVICE CONTROL BASED ON TIMING INFORMATION

(71) Applicant: Honda Motor Co., Ltd., Tokyo (JP)

(72) Inventor: Andrew Wang, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/592,072

(22) Filed: Oct. 3, 2019

(51) Int. Cl.
*H04W 4/30* (2018.01)
*H04L 12/28* (2006.01)
*H04W 4/029* (2018.01)
*H04W 4/021* (2018.01)

(52) U.S. Cl.
CPC ............ *H04W 4/30* (2018.02); *H04L 12/282* (2013.01); *H04W 4/021* (2013.01); *H04W 4/029* (2018.02)

(58) Field of Classification Search
CPC ........... H04W 4/00–043; H04W 4/203; H04W 4/30–38; H04W 4/70; H04W 4/80; H04L 12/282
See application file for complete search history.

(56) References Cited

U.S. PATENT DOCUMENTS

| 8,904,433 | B2 | 12/2014 | Cho et al. | |
|---|---|---|---|---|
| 2013/0101163 | A1* | 4/2013 | Gupta | G01C 21/206 382/103 |
| 2014/0039690 | A1* | 2/2014 | Steinberg | F24F 11/30 700/276 |
| 2014/0306833 | A1* | 10/2014 | Ricci | G06F 16/951 340/901 |
| 2017/0055118 | A1* | 2/2017 | Ciecko | H04W 4/21 |
| 2017/0099718 | A1* | 4/2017 | Stout | H04M 1/72533 |
| 2018/0110093 | A1* | 4/2018 | Deros | H01R 31/065 |
| 2018/0206083 | A1* | 7/2018 | Kumar | H04L 67/26 |
| 2019/0068393 | A1* | 2/2019 | Lee | G06K 9/6253 |

FOREIGN PATENT DOCUMENTS

| JP | 4122779 B2 | 7/2008 |
|---|---|---|
| JP | 2009232307 A | 10/2009 |

* cited by examiner

*Primary Examiner* — San Htun
(74) *Attorney, Agent, or Firm* — American Honda Motor Co., Inc.; Clifford B Vaterlaus

(57) ABSTRACT

A control device to provide control of electrical devices based on timing information. The control device stores device operational information which indicates an association between timing information and a plurality of operational modes for each of a set of electrical devices associated with a physical space. The control device detects a presence of a user within the physical space. The user is associated with an electronic apparatus. The control device further compares other timing information captured at a time of the detection of the presence of the user with the timing information. The control device determines an operational mode from the plurality of operational modes for each of the set of electrical devices based on the comparison. The control device further controls each of the set of electrical devices based on the determined operational mode.

16 Claims, 9 Drawing Sheets

| Time-zone (Mode) 402 | Plurality of Electrical Devices 108A-108N | User's Location 404 | | | | | | |
|---|---|---|---|---|---|---|---|---|
| | | Living Room 406 | Family Room 408 | Bedroom 410 | Study Room 412 | Kitchen 414 | Bathroom 416 | Outside 418 |
| Early Morning (4:00 am - 6:00 am) | Lights | 50% | 50% | 50% | 100% | 50% | 50% | 50% |
| | Blinds | Close | Close | Close | Close | Close | Close | - |
| | TV | ON(Low) | ON(Low) | ON(Low) | - | - | Medium | - |
| | Fan/Circulator/Ventilator | Low | Low | Low | Low | Low | - | - |
| Morning (6:00 am - 12:00 pm) | Lights | 30% | 30% | 30% | 70% | 30% | 30% | 30% |
| | Blinds | Open | Open | Open | Open | Open | Open | - |
| | TV | ON (Medium) | OFF | ON(Low) | - | - | - | - |
| | Fan/Circulator/Ventilator | Medium | Medium | Medium | Medium | - | Medium | - |
| Afternoon (12:00 pm - 5:00 pm) | Lights | 0% | 0% | 0% | 0% | 0% | 0% | 0% |
| | Blinds | Open | Open | Open | Open | Open | Open | - |
| | TV | ON (High) | ON (High) | ON (High) | - | High | - | - |
| | Fan/Circulator/Ventilator | High | High | High | High | High | High | - |
| Evening (5:00 pm - 8:00 pm) | Lights | 70% | 70% | 70% | 100% | 70% | 70% | 70% |
| | Blinds | Half Open | Half Open | Half Open | Half Open | Half Open | Half Open | - |
| | TV | ON (High) | ON (High) | ON (High) | - | - | - | - |
| | Fan/Circulator/Ventilator | High | High | High | High | High | High | - |
| Night (8:00 pm - 4:00 am) | Lights | 100% | 100% | 70% | 100% | 100% | 100% | 100% |
| | Blinds | Close | Close | Close | Close | Close | Close | - |
| | TV | ON (High) | ON (High) | ON (Medium) | - | - | - | - |
| | Fan/Circulator/Ventilator | High | High | Medium | High | High | High | - |
| Sleep | Lights | 20% | 20% | 10% | 20% | 20% | 20% | 100% |
| | Blinds | Close | Close | Close | Close | Close | Close | - |
| | TV | ON(Low) | ON(Low) | Off | - | - | - | - |
| | Fan/Circulator/Ventilator | Off | Off | Low | Off | Off | Low | - |

FIG. 4A

| Time-zone (Mode) 402 | Plurality of Electrical Devices 108A-108N | User's Location 404 | | | | | | | |
|---|---|---|---|---|---|---|---|---|---|
| | | Living Room 406 | Family Room 408 | Bedroom 410 | Study Room 412 | Kitchen 414 | Bathroom 416 | Outside 418 | Transition time 420 |
| Early Morning (4:00 am - 6:00 am) | Lights | 50% | 50% | 50% | 50% | 50% | 50% | 50% | 2 min |
| | Blinds | Close | Close | Close | Close | Close | Close | - | - |
| | TV | ON (LOW) | ON (Low) | ON (Low) | - | - | - | - | 2 min |
| | Fan/Ventilator | Low | Low | Low | Low | Low | Medium | - | 5 min |
| Morning (6:00 am - 12:00 pm) | Lights | 30% | 30% | 30% | 30% | 30% | 30% | 30% | 2 min |
| | Blinds | Open | Open | Open | Open | Open | Open | - | - |
| | TV | ON (LOW) | OFF | ON (Low) | - | - | - | - | 2 min |
| | Fan/Ventilator | Medium | Medium | Medium | Medium | High | Medium | - | 5 min |
| Afternoon (12:00 pm - 5:00 pm) | Lights | 0% | 0% | 0% | 0% | 0% | 0% | 0% | - |
| | Blinds | Open | Open | Open | Open | Open | Open | - | - |
| | TV | ON (High) | ON (High) | ON (High) | - | - | - | - | 2 min |
| | Fan/Ventilator | High | High | High | High | High | High | - | 5 min |
| Evening (5:00 pm - 8:00 pm) | Lights | 70% | 70% | 70% | 70% | 70% | 70% | 70% | 2 min |
| | Blinds | Half Open | Half Open | Half Open | Half Open | Half Open | Half Open | - | - |
| | TV | ON (High) | ON (High) | ON (High) | - | - | - | - | 2 min |
| | Fan/Ventilator | High | High | High | High | High | High | - | 5 min |
| Night (8:00 pm - 4:00 am) | Lights | 100% | 100% | 70% | 100% | 100% | 100% | 100% | 2 min |
| | Blinds | Close | Close | Close | Close | Close | Close | - | - |
| | TV | ON (High) | ON (High) | ON (Low) | - | - | - | - | 2 min |
| | Fan/Ventilator | High | High | Medium | High | High | High | - | 5 min |
| Sleep | Lights | 20% | 20% | 10% | 20% | 20% | 20% | 100% | 2 min |
| | Blinds | Close | Close | Close | Close | Close | Close | - | - |
| | TV | ON (Low) | ON (Low) | Off | Off | Off | Off | - | 2 min |
| | Fan/Ventilator | Off | Off | Low | Off | Off | Low | - | 5 min |

FIG. 4B

| Time-zone (Mode) 402 | Plurality of Electrical Devices 108A-108N | User's Location 404 ||||||| |
| --- | --- | --- | --- | --- | --- | --- | --- | --- |
| | | Living Room 406 | Family Room 408 | Bedroom 410 | Study Room 412 | Kitchen 414 | Bathroom 416 | Outside 418 |
| Early Morning (4:00 am - 6:00 am) | Lights | 0% | 0% | 0% | 0% | 0% | 0% | 0% |
| | Blinds | Close | Close | Close | Close | Close | Close | - |
| | TV | Off | Off | Off | - | - | - | - |
| | Fan/Ventilator | Low | Low | Low | - | - | - | - |
| Morning (6:00 am - 12:00 pm) | Lights | 0% | 0% | 0% | 0% | 0% | 0% | 0% |
| | Blinds | Open | Open | Open | Open | Open | Open | - |
| | TV | Off | Off | Off | - | - | - | - |
| | Fan/Ventilator | Low | Low | Low | Low | Low | Low | - |
| Afternoon (12:00 pm - 5:00 pm) | Lights | 0% | 0% | 0% | 0% | 0% | 0% | 0% |
| | Blinds | Open | Open | Open | Open | Open | Open | - |
| | TV | Off | Off | Off | - | - | - | - |
| | Fan/Ventilator | Low | Low | Low | Low | Low | Low | - |
| Evening (5:00 pm - 8:00 pm) | Lights | 0% | 0% | 0% | 0% | 0% | 0% | 0% |
| | Blinds | Close | Close | Close | Close | Close | Close | - |
| | TV | Off | Off | Off | - | - | - | - |
| | Fan/Ventilator | Low | Low | Low | Low | Low | Low | - |
| Night (8:00 pm - 4:00 am) | Lights | 20% | 20% | 20% | 20% | 20% | 20% | 20% |
| | Blinds | Close | Close | Close | Close | Close | Close | - |
| | TV | Off | Off | Off | - | - | - | - |
| | Fan/Ventilator | Low | Low | Low | Low | Low | Low | - |
| Sleep | Lights | 0% | 0% | 0% | 0% | 0% | 0% | 0% |
| | Blinds | Close | Close | Close | Close | Close | Close | - |
| | TV | Off | Off | Off | - | - | - | - |
| | Fan/Ventilator | Off | Off | Off | Off | Off | Off | - |

FIG. 4C

| Time-zone (Mode) 402 | Mode Information 422 | Plurality of Electrical Devices 108A-108N | User's Location 404 ||||||
|---|---|---|---|---|---|---|---|---|
| | | | Living Room 406 | Family Room 408 | Bedroom 410 | Study Room 412 | Kitchen 414 | Bathroom 416 | Outside 418 |
| Early Morning (4:00 am - 6:00 am) | Sleep | Lights | 20 % | 20 % | 20 % | 20 % | 20 % | 20 % | 70 % |
| | | Blinds | Close | Close | Close | Close | Close | Close | - |
| | | TV | Off | Off | Off | - | - | - | - |
| | | Fan/Ventilator | High | High | High | High | - | - | - |
| Morning (6:00 am - 9:00 am) | Family | Lights | 70 % | 30% | 30% | 70 % | 30% | 30% | 30 % |
| | | Blinds | Open | Open | Open | Open | Open | Open | - |
| | | TV | ON(Low) | ON(Low) | ON(Low) | - | - | - | - |
| | | Fan/Ventilator | High | High | High | High | High | High | 0% |
| Afternoon (9:00 am - 5:00 pm) | Office/ Business | Lights | 100% | 30% | 0% | 100% | 20% | 20% | - |
| | | Blinds | Open | Open | Open | Open | Open | Open | - |
| | | TV | Off | Off | Off | - | - | - | - |
| | | Fan/Ventilator | High | High | High | High | High | High | 70 % |
| Evening (5:00 pm - 8:00 pm) | Workout/ Welcome/ Guest | Lights | 70 % | 70 % | 70 % | 70 % | 70 % | 70 % | - |
| | | Blinds | Half Open | Half Open | Half Open | Half Open | Half Open | Half Open | - |
| | | TV | ON (High) | ON (High) | ON(High) | - | - | - | - |
| | | Fan/Ventilator | High | High | High | High | High | High | 100% |
| Night (8:00 pm - 11:00 pm) | Family/ Friend/ Party/Movie | Lights | 100% | 100 % | 100 % | 100% | 100% | 100% | - |
| | | Blinds | Half Open | Half Open | Half Open | Half Open | Half Open | Half Open | - |
| | | TV | ON(High) | ON (High) | ON(High) | - | - | - | - |
| | | Fan/Ventilator | High | High | Medium | High | High | High | 100% |
| Sleep | Sleep | Lights | 20 % | 20% | 10 % | 20 % | 20% | 20% | - |
| | | Blinds | Close | Close | Close | Close | Close | Close | - |
| | | TV | Off | Off | Off | Off | Off | Off | - |
| | | Fan/Ventilator | Off | Off | Low | - | - | - | - |

FIG. 4D

DEVICE CONTROL BASED ON TIMING INFORMATION

BACKGROUND

Various new technologies are being developed to control devices, such as electronic and electrical home appliances within a premises, such as a building, home, school, college, office, and the like. Typically, the devices are switched ON/OFF based on various methods such as manual user input or detection of a user. In certain situations, in case there are multiple devices in each space (for example a room) within the premises, the user is required to manually control the settings of the devices based on movement of the user between different spaces. For example, when the user moves from a living room to a bedroom at night, a device setting of the bedroom room is set similar to the device setting of the living room. The device setting of the living room may be inconvenient to the user in the bedroom at the night, because either lights in the bedroom may be too bright or a television volume may be too loud. Further, the user is required to provide manual input when the settings of the devices are to be switched at different time instants. For example, if the user turns off the lights in the living room during the daytime, the device setting of the living room is continued and the lights may not be turned on even in the nighttime which may not be desired by the user and the user has to manually change the settings of each device repeatedly. Thus, there is a need for a smart system which may control a large number of devices in each space within the premises to improve the convenience of the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a control device to control electrical devices based on timing information. The control device may include a memory and control circuitry coupled with the memory. The memory may be configured to store first device operational information which may indicate a first association between first timing information and a first plurality of operational modes for each of a first set of electrical devices associated with a first physical space. The control circuitry may be configured to detect a presence of a first user within the first physical space. The first user may be associated with a first electronic apparatus. The control circuitry may be further configured to compare second timing information captured at a time of the detection of the presence of the first user with the first timing information of the first device operational information. The control circuitry may be further configured to determine, based on the comparison, a first operational mode from the first plurality of operational modes for each of the first set of electrical devices associated with the first physical space. The control circuitry may be further configured to control each of the first set of electrical devices based on the determined first operational mode.

Another exemplary aspect of the disclosure provides a method for controlling electrical devices based on timing information. Any computing device, for example, a control device, may execute operations specified in the method. The method may include storing first device operational information which may indicate a first association between first timing information and a first plurality of operational modes for each of a first set of electrical devices associated with a first physical space. The method may further include detecting a presence of a first user within the first physical space. The first user may be associated with a first electronic apparatus. The method may further include comparing second timing information captured at a time of the detection of the presence of the first user with the first timing information of the first device operational information. The method may further include determining, based on the comparison, a first operational mode from the first plurality of operational modes for each of the first set of electrical devices associated with the first physical space. The method may further include controlling each of the first set of electrical devices based on the determined first operational mode.

This summary is provided to introduce a selection of concepts in a simplified form that are further described in the detailed description of the present disclosure. This summary is not intended to identify key or essential inventive concepts of the claimed subject matter, nor is it intended for determining the scope of the claimed subject matter.

BRIEF DESCRIPTION OF THE DRAWINGS

FIGS. 4A, 4B, 4C, and 4D collectively illustrate exemplary scenarios to provide control of electrical devices within a physical space by the control device of FIG. 2 based on timing information, in accordance with an embodiment of the disclosure.

Figure 1:
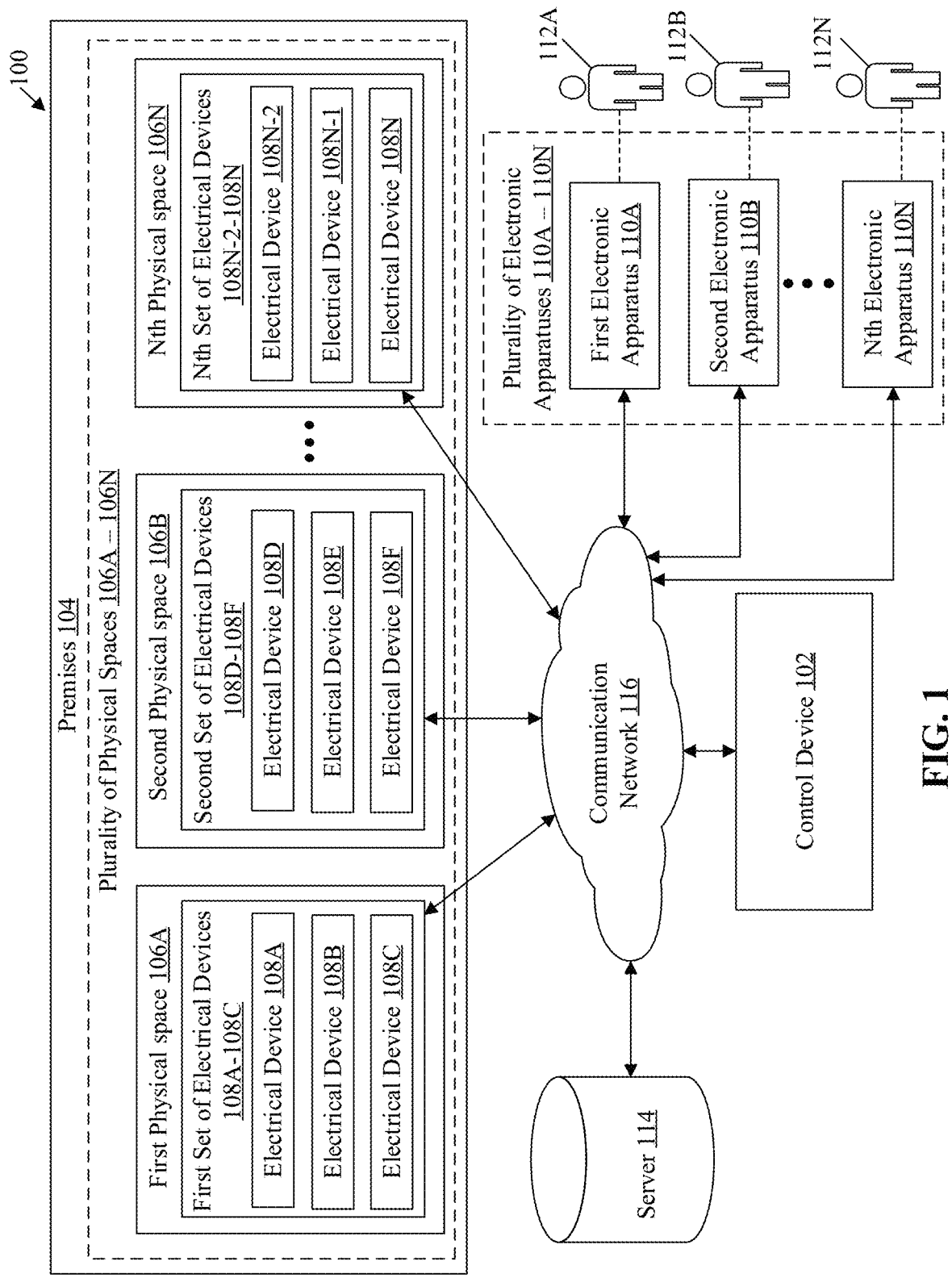
FIG. 1 illustrates an exemplary environment to provide control of electrical devices based on timing information, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in a control device to provide timing information based control of electrical devices, for example, home appliances, such as fan, television (TV), light, and the like.

The disclosed control device may store device operational information for a set of electrical devices associated with a physical space (for example, a living room, a bedroom) of a premises. The device operational information may indicate an association between first timing information (for example time-zones) and a plurality of operational modes for each of the set of electrical devices. The device operational information (i.e. indicating the first timing information and the plurality of operational modes) may be set by a user in advance and stored in the control device. The control device may be configured to detect a presence of the user (i.e. associated with an electronic apparatus, such as a mobile phone) within the physical space of the premises. The control device may further capture second timing information (for example a detection time) at which the user enters the physical space. The control device may further compare the stored first timing information with the second timing information and determine an operational mode from the plurality of operational modes for each of the set of electrical devices based on the comparison. The control device may further control each of the set of electrical devices based on the determined operational mode. Thus, the disclosed control device provides flexibility to users to control the electrical devices in a plurality of physical spaces of the premises based on the operational mode automatically determined based on the timing information (i.e. stored first timing information) and detection of the user in the physical spaces. The automatic determination of the operational mode for each of the set of electrical devices based on the stored timing information may avoid a requirement of a manual input from the user to control a large number of electrical devices at different time-zones, and may further enhance the convenience of the user.

FIG. 1 illustrates an exemplary environment to provide control of electrical devices based on timing information, in accordance with an embodiment of the disclosure. With reference to FIG. 1, there is shown an exemplary environment 100. The exemplary environment 100 may include a control device 102. The exemplary environment 100 may further include a plurality of physical spaces 106A-106N within a premises 104. Examples of the premises 104 may include, but are not limited to, a home, a building, an office, a college, any residential or non-residential area. Examples of the plurality of physical spaces 106A-106N may include, but are not limited to, a living room, a family room, a bed room, a guest room, a kitchen, a bathroom, a basement, a study room, a workout room, a training room, a meeting room, a conference room, a play room, a garage, a store room, a frontyard, a backyard, a patio, and/or any area within the premises 104. As shown in FIG. 1, the exemplary environment 100 may further include a plurality of electrical devices 108A-108N disposed in the plurality of physical spaces 106A-106N. The exemplary environment 100 may further include a plurality of electronic apparatuses 110A-110N associated with a plurality of users 112A-112N. The exemplary environment 100 may further include a server 114 and a communication network 116. The control device 102, the plurality of electrical devices 108A-108N, and the plurality of electronic apparatuses 110A-110N may communicate with each other through the communication network 116.

As shown in FIG. 1, the plurality of electrical devices 108A-108N may include N set of electrical devices, such as a first set of electrical devices 108A-108C, a second set of electrical devices 108D-108F, and an Nth set of electrical devices 108N-2-108N. The first set of electrical devices 108A-108C may be associated with a first physical space 106A of the plurality of physical spaces 106A-106N. The second set of electrical devices 108D-108F may be associated with a second physical space 106B of the plurality of physical spaces 106A-106N. Further, the Nth set of electrical devices 108N-2-108N may be associated with an Nth physical space 106N of the plurality of physical spaces 106A-106N. It may be noted that three electrical devices included in one physical space as shown in FIG. 1 is presented merely as an example. The physical space (such as the first physical space 106A, the second physical space 106B) may include only one or more than three electrical devices, without a deviation from scope of the disclosure.

Figure 2:
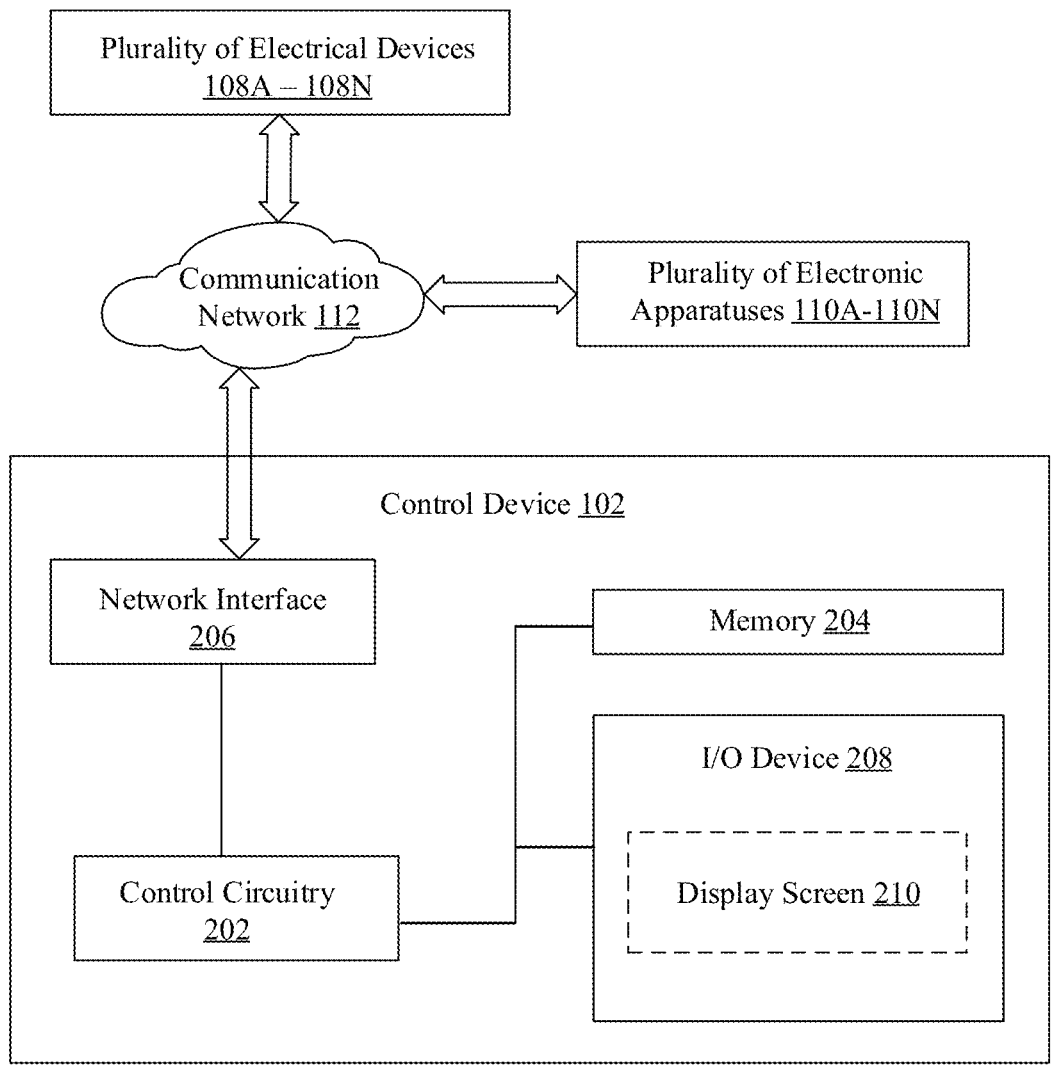
FIG. 2 illustrates a block diagram of an exemplary control device to provide control of electrical devices based on timing information, in accordance with an embodiment of the disclosure.

The control device 102 may include suitable logic, circuitry, interfaces, and/or code that may be configured to control the plurality of electrical devices 108A-108N associated with the plurality of physical spaces 106A-106N within the premises 104. The control device 102 may be configured to store device operational information (i.e. set based on user inputs) associated with each of the plurality of electrical devices 108A-108N in a memory (such as a memory 204 as shown in FIG. 2) of the control device 102 or in the server 114. Further, the control device 102 may be configured to acquire the device operational information from the memory or from the server 114. The device operational information may indicate association between the timing information and a plurality of operational modes for each of the plurality of electrical devices 108A-108N, where the timing information may be associated with a plurality of time-zones such as, but not limited to, a morning time-zone, an evening time-zone, a night time-zone, a sleep time-zone, and the like. The control device 102 may be further configured to determine an operational mode from the plurality of operational modes for the plurality of electrical devices 108A-108N, and control the plurality of electrical devices 108A-108N based on the determined operational mode. Examples of the control device 102 may include, but are not limited to, a computing device, a programmatically-controlled machine, a mainframe machine, a server, and/or a computer work-station. Although, FIG. 1 shows the control device 102 to be disposed outside the premises 104 and connected to the plurality of electrical devices 108A-108N via the communication network 116, the control device 102 may also be disposed within the premises 104, and connected to the plurality of electrical devices 108A-108N directly via a home network or through short range communication protocols.

Each of the plurality of electrical devices 108A-108N may comprise suitable logic, circuitry, interfaces, and/or code that may be configured to communicate with (or be controlled by) the control device 102, via the communication network 116. The plurality of electrical devices 108A-108N may be disposed in the plurality of physical spaces 106A-106N within the premises 104. Examples of the plurality of electrical devices 108A-108N may include, but are not limited to, a display, a television (TV), a smart appliance, a computing device, a gaming device, a refrigerator, a lighting device, an audio rendering device, a sound bar, a video device, an audio-video rendering device, a fan, a ventilator, blinds, a smart furniture, an electronic circulation vent, a heating, ventilation, and air conditioning (HVAC) system, a consumer electronic (CE) device, or other electrical/electronic home appliances.

Each of the plurality of electronic apparatuses 110A-110N may comprise suitable logic, circuitry, interfaces, and/or code that may be configured to communicate with the control device 102, via the communication network 116.

Each of the plurality of electronic apparatuses 110A-110N may be configured to receive one or more user inputs from a corresponding user of the plurality of users 112A-112N. In accordance with an embodiment, the plurality of electronic apparatuses 110A-110N may be configured to control the plurality of electrical devices 108A-108N, through the control device 102. In some embodiments, one of the plurality of electronic apparatuses 110A-110N may be configured to control the plurality of electrical devices 108A-108N directly. Examples of the plurality of electronic apparatuses 110A-110N may include, but are not limited to, a display system, a smart TV remote with storage capability, a smart watch, a wearable device, a computing device, a gaming device, a mobile phone, a smartphone, a computer workstation, a consumer electronic (CE) device, or an electronic device with capability to store, transmit, and render multimedia content.

The server 114 may comprise suitable logic, circuitry, interfaces, and/or code that may be configured to store the device operational information associated with each of the plurality of electrical devices 108A-108N. The server 114 may be configured to transmit the device operational information to the control device 102, via the communication network 116. In accordance with an embodiment, the server 114 may be configured to store information associated with each of the plurality of electrical devices 108A-108N, for example, electronic program guide (EPG) information of the TV, and capability of the plurality of electrical devices 108A-108N, and the like. The server 114 may be implemented as a cloud server, which may be utilized to execute various operations through web applications, cloud applications, HTTP requests, repository operations, file transfer, gaming operations, and the like. Examples of the server 114 may include, but are not limited to, an application server, a cloud server, a web server, a database server, a file server, a mainframe server, or a combination thereof.

The communication network 116 may include a communication medium through which the control device 102, the plurality of electrical devices 108A-108N, the plurality of electronic apparatuses 110A-110N, and the server 114 may communicate with each other. Examples of the communication network 116 may include, but are not limited to, Internet, a cloud network, a Long Term Evolution (LTE) network, a Local Area Network (LAN), a Wireless-Fidelity (Wi-Fi) network. Various devices in the network environment may be configured to connect to the communication network 116, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the control device 102 may be configured to store first device operational information in a memory (such as a memory 204 shown in FIG. 2) associated with the control device 102. The first device operational information may indicate a first association between first timing information (for example the plurality of time-zones) and a first plurality of operational modes for each of the first set of electrical devices 108A-108C associated with the first physical space 106A. The first plurality of operational modes may correspond to modes of operation of each of the first set of electrical devices 108A-108C. For example, a fan (i.e. an electrical device) may have three operational modes such as low, medium, and high with respect to a speed of the fan. In another example, a sound volume of a television may have, for example, three operational modes such as low, medium, and high with respect to a volume level of the television. Details of the plurality of operational modes are described, in detail, for example, in FIGS. 4A, 4B, 4C, and 4D. The control device 102 may be configured to retrieve, from the memory, the first device operational information. In some other embodiments, the first device operational information may be stored in the server 114, and the control device 102 may be configured to retrieve the first device operational information from the server 114, via the communication network 116.

In an event a first user 112A enters the first physical space 106A, the control device 102 may be configured to detect a presence of the first user 112A within the first physical space 106A. Details of the detection of the presence of the first user 112A within the first physical space 106A may be described in detail, for example, in FIG. 3. Further, the control device 102 may be further configured to capture second timing information associated with a time at which the presence of the first user 112A may be detected within the first physical space 106A. In some embodiments, the second timing information may indicate a current time of the detection of the first user 112A within the first physical space 106A. The control device 102 may be further configured to compare the first timing information stored in the first device operational information with the captured second timing information. More specifically, the control device 102 may be configured to match a time of day or a time zone indicated in the first timing information with the time of day or the time zone indicated in the second timing information based on the comparison.

The control device 102 may be further configured to determine a first operational mode from the plurality of operational modes for each of the first set of electrical devices 108A-108C associated with the first physical space 106A, based on the comparison of the first timing information and the second timing information. The control device 102 may be further configured to control operations of each of the first set of the electrical devices 108A-108C based on the determined first operational mode. Further, the determined first operational mode for each of the first set of electrical devices 108A-108C may be different in each of the plurality of time-zones. For example, the control device 102 may control ON-OFF operation, a control parameter of a operation, a level or speed or intensity of a operation, a mode of operation, a duration of operation, any other setting, and the like of each of the first set of the electrical devices 108A-108C. The operation for controlling each of the first set of electrical devices 108A-108C is described in detail, for example, in FIGS. 4A, 4B, 4C, and 4D.

Thus, the disclosed control device 102 may facilitate the first user 112A to automatically control each of the first set of electrical devices 108A-108C associated with the first physical space 106A based on the stored timing information (time-zones) and the detection of the presence of the first user 112A within the first physical space 106A of the premises 104. This may further improve device experience and convenience of the first user 112A with respect to the control of the electrical devices, such as home appliances, based on stored the timing information (such as the first timing information included in the stored first device operational information).

FIG. 2 is a block diagram that illustrates an exemplary control device to control electrical devices based on timing information, in accordance with an embodiment of the disclosure. FIG. 2 is explained in conjunction with elements from FIG. 1. With reference to FIG. 2, there is shown a block diagram 200 of the control device 102. The control device 102 may include control circuitry 202, a memory 204, a network interface 206, and an input/output (I/O) device 208. The I/O device 208 may include a display screen 210. The control circuitry 202 may be communicatively coupled to the memory 204, the network interface 206, and the I/O device 208.

The control circuitry 202 may include suitable logic, circuits, interfaces, and/or that may be configured to execute program instructions associated with operations to be executed by the control device 102. Some of the operations may include, for example, detection of presence of the plurality of users 112A-112N, determination of an operational mode for the plurality of electrical devices 108A-108N, control of the plurality of electrical devices 108A-108N, and the like. The control circuitry 202 may include one or more processing units, which may be implemented as a separate processor. In an embodiment, the one or more processing units may be implemented as one integrated processor or a cluster of processors that execute the functions of the one or more processing units, collectively. The control circuitry 202 may be implemented based on a number of processor technologies known in the art. Examples of the control circuitry 202 may include, but are not limited to, an x86-based processor, a Graphical Processing Unit (GPU), a Reduced Instruction Set Computer (RISC) processor, an Application Specific Integrated Circuit (ASIC) processor, a Complex Instruction Set Computer (CISC) processor, a microcontroller, a Central Processing Unit (CPU), and/or a combination thereof.

The memory 204 may comprise suitable logic, circuitry, interfaces, and/or code that may be configured to store instructions executable by the control circuitry 202. In accordance with an embodiment, the memory 204 may be further configured to store, for example, the first device operational information, a plurality of user profiles associated with the plurality of users 112A-112N, user inputs, and the like. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, interfaces, and/or code that may be configured to establish a communication between the control device 102, the plurality of electrical devices 108A-108N, the plurality of electronic apparatuses 110A-110N, and the server 114, via the communication network 116. The network interface 206 may be implemented by use of various known technologies to support wired or wireless communication of the control device 102 with the communication network 116. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer.

The I/O device 208 may comprise suitable logic, circuitry, interfaces, and/or code that may be configured to act as an I/O channel/interface between the plurality of users 112A-112N, the different operational components of the control device 102, and/or the plurality of electrical devices 108A-108N. The I/O device 208 may be configured to receive plurality of user inputs from the plurality of users 112A-112N, and relay the received plurality of user inputs to the control circuitry 202, via dedicated buses. The I/O device 208 may include various input and output devices, which may be configured to communicate with different operational components of the control device 102 and/or the plurality of electrical devices 108A-108N. Examples of the I/O device 208 may include, but are not limited to, a touch screen, a keyboard, a mouse, a joystick, a microphone with voice recognition, a display screen (for example the display screen 210), a speaker, an image capturing device with gesture recognition, and the like. In an embodiment, the I/O device 208 may be configured to receive user input to set the association between the plurality of operational modes for the plurality of electrical devices 108A-108N and the plurality of time zones (i.e. which may indicated by the first timing information) in advance before automatic control of the plurality of electrical devices 108A-108N.

The display screen 210 may comprise suitable logic, circuitry, and/or interfaces that may be configured to render multimedia content. In accordance with an embodiment, the display screen 210 may be a touch screen configured to receive the plurality of user inputs (for example to set the first device operational information) from the plurality of users 112A-112N. The touch screen may be at least one of, but is not limited to, a resistive touch screen, a surface acoustic wave touch screen, or a capacitive touch screen. The display screen 210 may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 210 may refer to a display screen of a smart-glass device, a see-through display, a projection-based display, an electro-chromic display, or a transparent display. In accordance with an embodiment, the display screen 210 may be an external display screen that may be connected to the control device 102.

Modifications, additions, or omissions may be made to FIG. 2 without departing from the scope of the present disclosure. For example, the block diagram 200 may include more or fewer elements than those illustrated and described in the present disclosure. Operations executed by the control device 102 are described in detail, for example, in FIGS. 3, 4A, 4B, 4C, 4D, 5, and 6.

Figure 3:
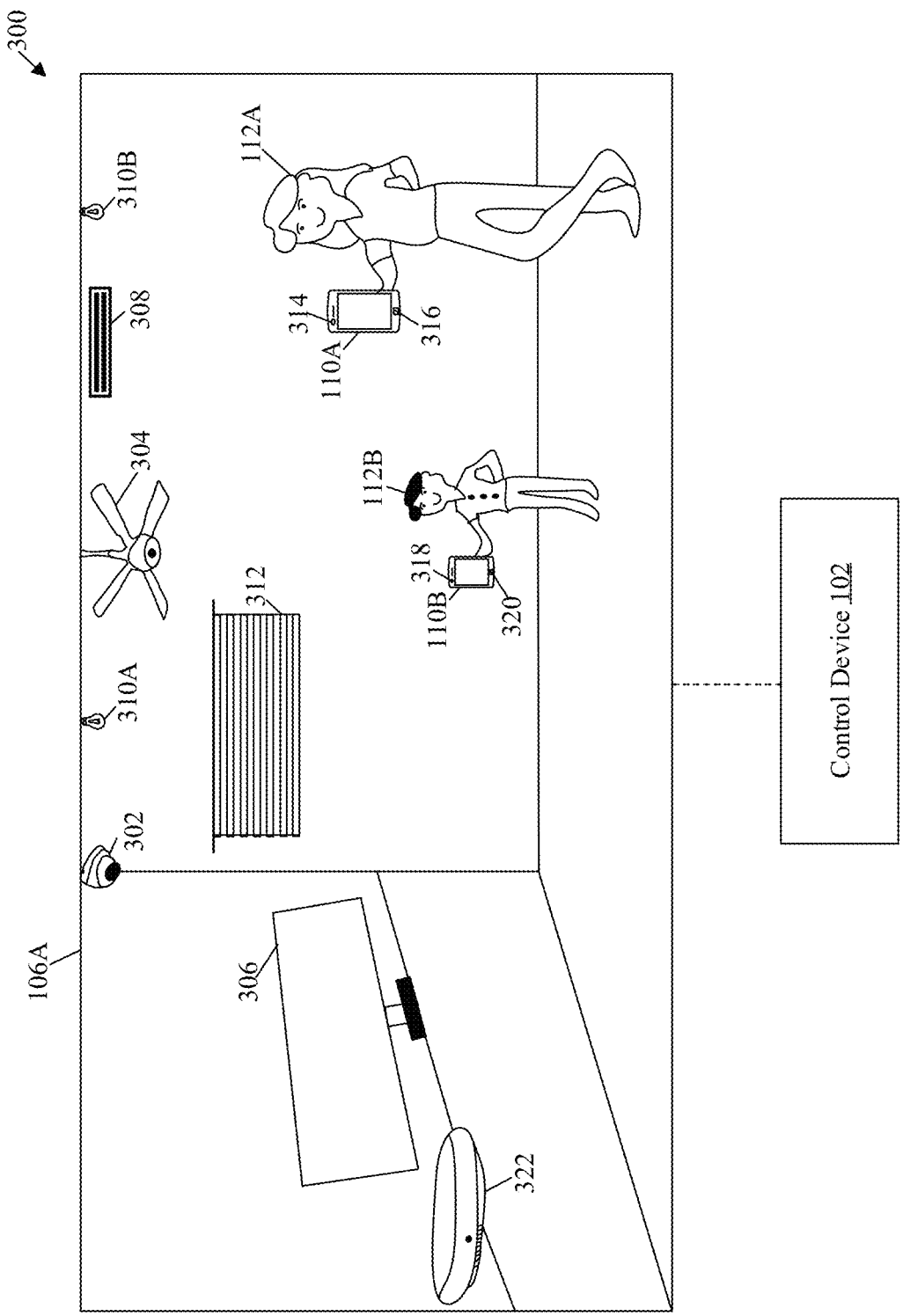
FIG. 3 illustrate an exemplary scenario for detection of presence of a user within a physical space by the control device of FIG. 2, in accordance with an embodiment of the disclosure.

FIG. 3 illustrates an exemplary scenario for detection of presence of a user within a physical space by the control device of FIG. 2, in accordance with an embodiment of the disclosure. FIG. 3 is explained in conjunction with elements from FIGS. 1 and 2. With reference to FIG. 3, there is shown an exemplary scenario 300.

In the exemplary scenario 300, there is shown the first physical space 106A (for example a room). There is further shown the first user 112A and a second user 112B within the first physical space 106A. The scenario 300 further include an image capturing device 302 in the first physical space 106A. There are further shown examples of the plurality of electrical devices 108A-108N, such as, a fan 304, a television (TV) 306, a ventilator 308, lights 310A and 310B, blinds 312, and the like, in the first physical space 106A. There is further shown a first electronic apparatus 110A associated with the first user 112A and a second electronic apparatus 110B associated with the second user 112B. The first electronic apparatus 110A may include an image capturing device 314 and a geo-location tracking device 316, for example, a global positioning system (GPS) device. The second electronic apparatus 110B may include an image capturing device 318 and a geo-location tracking device 320. There is further shown a presence sensing device 322 that may operate using radio frequency (RF) technology in the first physical space 106A. In accordance with an embodiment, control device 102 may be communicatively coupled with each of the first electronic apparatus 110A, the second electronic apparatus 110B, the image capturing device 302, the fan 304, the TV 306, the ventilator 308, the lights 310A and 310B, the blinds 312, and the presence sensing device 322 within the first physical space 106A, via the communication network 116.

It may be noted that the first electronic apparatus 110A, the second electronic apparatus 110G, the image capturing device 302, the fan 304, the TV 306, the ventilator 308, the lights 310A and 310B, the blinds 312, and the presence sensing device 322 shown in FIG. 3 is presented merely as an example. The present disclosure may be also applicable to other types of the first electronic apparatus 110A, the second electronic apparatus 110G, the image capturing device 302, the fan 304, the TV 306, the ventilator 308, the lights 310A and 310B, the blinds 312, and the presence sensing device 322. A description of other types of has been omitted from the disclosure for the sake of brevity.

The memory 204 may be configured to store sample images of the first user 112A and/or the second user 112B associated with the premises 104 or the plurality of physical spaces 106A-106N. In accordance with an embodiment, the control circuitry 202 of the control device 102 may be configured to control the image capturing device 302 to capture one or more images of an area in the first physical space 106A based on a field-of-view (FOV) of the image capturing device 302. Examples of the image capturing device 302, may include, but are not limited to, an image sensor, a wide-angle camera, an action camera, a closed-circuit television (CCTV) camera, a 360 degree camera, a camcorder, a digital camera, camera phones, a time-of-flight camera (ToF camera), a night-vision camera, and/or other image capture devices. The image capturing device 302 may be controlled to capture the one or more images of the area of the first physical space 106A at a predefined time interval. When the first user 112A and/or the second user 112G enter the first physical space 106A, the captured one or more images of the area may include an image of the first user 112A and/or the second user 112G.

The image capturing device 302 may be configured to transmit the captured one or more images and time information (for example the second timing information) at which the one or more images may be captured to the control circuitry 202 of the control device 102. The control circuitry 202 may be configured to receive the captured images and the time information, and detect the presence of the first user 112A and/or the second user 112G in the first physical space 106A based on the detected image of the first user 112A and/or the second user 112B. More specifically, the control circuitry 202 may be configured to detect a corresponding image of the first user 112A and/or the second user 112B in the captured one or more images based on the sample images of the first user 112A and/or the second user 112G stored in the memory 204. The control circuitry 202 may be configured to compare the stored sample images of the first user 112A and/or the second user 112G with the captured images to detect corresponding image of the first user 112A and/or the second user 112B. The control circuitry 202 may be further configured to detect the presence of the first user 112A and/or the second user 112B within the first physical space 106A based on the detected image of the first user 112A and/or the second user 112b in the one or more images captured by the image capturing device 302.

In some embodiments, the memory 204 may be further configured to store images of different objects present in the first physical space 106A. In some embodiments, the memory 204 may further store corresponding positions of the objects in the first physical space 106A. The objects may correspond to, for example, the image capturing device 302, the fan 304, the TV 306, the ventilator 308, the blinds 312, interior of the first physical space 106A, or any object (such as a furniture, a hanging picture frame) present within the first physical space 106A. The image capturing device 314 of the first electronic apparatus 110A and/or the image capturing device 318 of the second electronic apparatus 110G may be configured to capture the images of at least one object present within the first physical space 106A. The first electronic apparatus 110A and/or the second electronic apparatus 110G may be configured to transmit the captured images of the at least one object and the time information (for example the second timing information) associated with the capture of the images of the object to the control circuitry 202.

The control circuitry 202 may be configured to receive the images of the at least one object and the time information. The control circuitry 202 may be configured to detect and identify the presence of the first user 112A and/or the second user 112B within the first physical space 106A based on comparison of the stored images of the objects and the received image of the at least one object. For example, in case the received image includes the image of the TV 306 which may be present in the first physical space 106A (such as living room), then the control circuitry 202 may detect the presence of the first user 112A in the first physical space 106A (such as the living room) based on the detection of the image of the TV 306 in the received image.

In some embodiments, the geo-location tracking device 316 of the first electronic apparatus 110A and/or the geo-location tracking device 320 of the second electronic apparatus 110G may be configured to detect a geo-location (i.e. GPS location) of the first electronic apparatus 110A of the first user 112A and/or a geo-location of the second electronic apparatus 110G of the second user 112G, respectively. Examples of the geo-location tracking device 316 and/or the geo-location tracking device 320, may include, but are not limited to, a Global Navigation Satellite System (GNSS)-based sensor of the first electronic apparatus 110A or the second electronic apparatus 110G. Examples of the GNSS-based sensor may include, but are not limited to, global positioning sensor (GPS), Global Navigation Satellite System (GLONASS), or other regional navigation systems or sensors.

In an embodiment, the first electronic apparatus 110A and/or the second electronic apparatus 110G may be configured to transmit information about the detected geo-location to the control circuitry 202 of the control device 102. In some cases, the first electronic apparatus 110A and/or the second electronic apparatus 110G may be configured to transmit the information about the detected geo-location to the control circuitry 202 in response to detection of the movement of the first user 112A and/or the second user 112B exceeding a threshold distance. In other cases, the first electronic apparatus 110A and/or the second electronic apparatus 110G may be configured to receive user inputs from the first user 112A and/or the second user 112B to transmit the information about the detected geo-location to the control circuitry 202. Alternatively, the first electronic apparatus 110A and/or the second electronic apparatus 110B may be configured to automatically transmit the information about the detected geo-location to the control circuitry 202 after every predetermined time interval. For example, the first electronic apparatus 110A and/or the second electronic apparatus 110B may be configured to automatically transmit the information about the detected geo-location to the control circuitry 202 at every 10 seconds, or 10 minutes, or every 20 minutes, or so on. Further, the control circuitry 202 may be configured to receive the information about the detected geo-location from the first electronic apparatus 110A and/or the second electronic apparatus 110B, and detect the presence of the first user 112A and/or the second user 112B within the first physical space 106A of the premises 104 based on the received information about the detected geo-location of the first electronic apparatus 110A and/or the second electronic apparatus 110B.

In some embodiments, the presence sensing device 322 located in the first physical space 106A may be configured to communicate with the control device 102. The presence sensing device 322 may correspond to, for example, a cordless phone, a mobile phone, a RF device, a Bluetooth device, a Wi-Fi system, a near field communication (NFC) device, a radio-frequency identification (RFID) system, and the like. The presence sensing device 322 may be further configured to communicate with the first electronic apparatus 110A and/or the second electronic apparatus 110B in case a distance between the presence sensing device 322 and the first electronic apparatus 110A (or the second electronic apparatus 110B) is within a defined threshold distance or a defined communication range of the presence sensing device 322. The presence sensing device 322 may be configured to transmit information about the communication between the presence sensing device 322 and the first electronic apparatus 110A, and/or information about the communication between the presence sensing device 322 and the second electronic apparatus 110B to the control circuitry 202 of the control device 102. In accordance with an embodiment, the control circuitry 202 may be configured to receive the information about connection or communication between the presence sensing device 322 and the first electronic apparatus 110A and/or the second electronic apparatus 110B. The control circuitry 202 may be further configured to detect the presence of the first user 112A and/or the second user 112B within the first physical space 106A based on the received information from the presence sensing device 322.

Thus, the disclosed control device 102 may detect the presence of the first user 112A and/or the second user 112B within the first physical space based on different methods (such as, but not limited to, based on the captured images of the first user 112A, captured images of the objects present within the first physical space 106A, information about the detected geo-location, information received from the presence sensing device 322). The control circuitry 202 may be configured to detect the presence of each of the plurality of users 112A-112N within each of the plurality of physical spaces 106A-106N in the premises 104 using such methods as described above. The details for detection of rest of the users from the plurality of users 112A-112N are omitted from the disclosure for the sake of brevity.

FIGS. 4A, 4B, 4C, and 4D collectively illustrate exemplary scenarios to provide control of electrical devices within a physical space by the control device of FIG. 2 based on timing information, in accordance with an embodiment of the disclosure. FIG. 4A is explained in conjunction with elements from FIGS. 1-3. With reference to FIG. 4A, there is shown a table 400A indicating a first scenario. A first column of the table 400A may correspond to time-zones (or timing modes) 402, a second column of the table 400A may correspond to the plurality of electrical devices 108A-108N within each physical space of the premises 104, and a third column of the table 400A may correspond to user's location 404 in one of the plurality of physical spaces 106A-106N where entry or presence of a user (for example the first user 112A) may be detected. The time-zone 402 may include a plurality of time-zones which may indicate the timing information, for example, an early morning time-zone (4:00 am-6:00 am), a morning time-zone (6:00 am-12:00 pm), an afternoon (12:00 pm-5:00 pm) time-zone, an evening (5:00 pm-8:00 pm) time-zone, a night (8:00 pm-4:00 am) time-zone, and a sleep time-zone. The timing information associated with each time-zone 402 may correspond to the first timing information. These time-zones (or timing modes) may be set by the first user 112A or any other user of the plurality of users 112A-112N. The memory 204 may be configured to store the plurality of time-zones set by the first user 112A. The plurality of users 112A-112N may add other custom modes or time-zones as desired in addition to the time-zones or modes shown in FIG. 4A. For example, the first user 112A may set a weekend mode in which the time-zone 402 or the operational modes of the plurality of electrical devices 108A-108N may differ from other days of the week. Alternatively, these time-zones or timing modes may be set by the manufacturer of the control device 102 as default modes.

In table 400 as shown in FIG. 4A, the third column may include a plurality of sub-columns corresponding to the plurality of physical spaces 106A-106N, for example, a living room 406, a family room 408, a bedroom 410, a study room 412, a kitchen 414, a bathroom 416, and an outside space 418. The user's location 404 may correspond to the current location (in one of the plurality of physical spaces 106A-106N) where the presence of the first user 112A may be detected as described, for example, in FIG. 3. There is further shown the plurality of electrical devices 108A-108N associated or present with each of the plurality of physical spaces 106A-106N. The plurality of electrical devices 108A-108N may include, for example, the lights 310A and 310B, the blinds 312, the TV 306, the fan 304, the circulator/ventilator 308, and the like. Each of the plurality of electrical devices 108A-108N may be associated with setting information or different operational levels (also referred to as a first plurality of operational modes) for the operation of each of the plurality of electrical devices 108A-108N in each of the plurality of physical spaces 106A-106N. For example, the setting information (as the first plurality of operational modes) of each of the plurality of electrical devices 108A-108N may be indicated as, but is not limited to, ON/OFF, low/medium/high, or open/half-open/close. In another example, the levels of an operation parameter (as the first plurality of operational modes) of each of the plurality of electrical devices 108A-108N may be indicated as a percentage, where a maximum level of the operation parameter under normal operating conditions may be 100%. For example, the levels of intensity of the lights 310A and 310B may be "50% brightness or the level of volume of the TV 306 may be "70%" loud.

The operation parameter of the lights 310A and 310B may include, for example, the brightness of the lights 310A and 310B as a percentage of the maximum brightness under the normal operating conditions. In some embodiments, the percentage of the brightness may be associated with a high level and/or a low level, based on an intensity value of the brightness. For example, the lights 310A and 310B in the living room 406 set at "30%" brightness may indicate that the lights 310A and 310B may be set at "low" level. For example, the levels of the operation parameter (as the first plurality of operational modes) of the blinds 312 may include, but is not limited to, the open, half open, and close position of the blinds 312.

The levels of the operation parameter (as the first plurality of operational modes) of the TV 306 may include, for example, the ON and OFF states of the TV 306. In another example, the levels of the operation parameter of the TV 306 may further include, for example, a volume level of the TV 306 such as low/medium/high as the first plurality of operational modes for the TV 306. The levels of the operation parameter (as the first plurality of operational modes) of the fan 304 and the circulator or ventilator 308 may include, for example, low, medium and high speeds. In an example scenario shown in FIG. 4A, a first operational mode of the first plurality of operational modes of the lights 310A and 310B in the "living room 406" in the "early morning" time-zone may be "50%", where the 50% may indicate the brightness level of the lights 310A and 310B. Similarly, the first operational mode of the blinds 312 in the "living room 406" in "early morning" time-zone may be "Close" and the first operational mode of the first plurality of operational modes of the TV 306 in the "living room 406" in "early morning" time-zone may be "low" volume as shown in FIG. 4A.

In accordance with an embodiment, the first operational mode may be set for each of the plurality of electrical devices 108A-108N in advance, as default settings, by the user (for example the first user 112A) in accordance with the time of a day such as daytime and nighttime or different time-zones. For example (as shown in FIG. 4A), the first operational mode (of the plurality of electrical devices 108A-108N) may indicate that in the daytime (e.g. in the "afternoon" time-zone) and in the family room 408, the brightness of the lights 310A and 310B may be "Low" or "0%", the position of the blinds 312 may be "Open", the volume and/or the brightness of the TV 306 may be "High", and/or the speed level of the fan 304 and the ventilator 308 may be "High". In another example (as shown in FIG. 4A), the first operational mode may indicate that in the "night" time-zone and in the family room 408, the brightness of the lights 310A and 310B may be "100%", the position of the blinds 312 may be "Close", the volume and the brightness of the TV 306 may "High", and/or the speed level of the fan 304 and the ventilator 308 may be "High". In accordance with an embodiment, the first operational mode may be set individually for each of the plurality of electrical devices 108A-108N, or may be set for a group of devices for each individual room to further control the group of devices based on the movement or presence of the first user 112A in different rooms.

In accordance with an embodiment, the memory 204 may be configured to store information shown in the table 400A. The memory 204 may be configured to store the first device operational information which may indicate the first association between the first timing information (for example, the time-zones 402 in the table 400A) and the first plurality of operational modes (for example ON/OFF, low/medium/high, open/half-open/close) for each of the plurality of electrical devices 108A-108N present or associated with the plurality of physical spaces 106A-106N.

Examples of the first timing information which may indicate a plurality of time-slots associated with the plurality of time-zones is described below in Table 1:

| Time-Zone | Time-slot |
|---|---|
| Early Morning | 4:00 AM-6:00 AM |
| Morning | 6:00 AM-12:00 PM |
| Afternoon | 12:00 PM-5:00 PM |
| Evening | 5:00 PM-8:00 PM |
| Night | 8:00 PM-4:00 AM |
| Sleep | Custom Sleep timings |

In Table 1, there is shown an association between the plurality of time-zones and different time slots. For example, morning time-zone may be associated with a time slot of 6:00 AM-12:00 PM. The control circuitry 202 may be configured to change settings of the plurality of time-zones based on user inputs received, via the I/O device 208. The first user 112A may provide the user inputs via the first electronic apparatus 110A to change the settings of the time slots of the plurality of time-zones.

As shown in the Table 1, the sleep time-zone may be a time-zone in which the first user 112A may be sleeping in the bedroom 410 or any other room. In accordance with an embodiment, the first user 112A may provide a user input corresponding to the sleep mode, via the user interface (displayed on a display screen 510 shown in FIG. 5), to the first electronic apparatus 110A. The control circuitry 202 may be configured to receive the user input associated with the sleep mode from the first electronic apparatus 110A and set the sleep mode based on the user input.

In some other embodiments, when the first user 112A turns-off the light 310A and 310B of one of the rooms (for example the bedroom 410), the control circuitry 202 may be configured to detect that the light 310A and 310B of the bedroom 410 is turned-off. The control circuitry 202 may be further configured to set the sleep time-zone for the first user 112A based on the detection that the light 310A and 310B of the bedroom 410 is turned-off. In some other embodiments, the sleep time-zone may be detected based on position of the first user 112A for example, in a bed. The control circuitry 202 may be configured to detect the presence of the first user 112A based on the images of the first user captured by the image capturing device 302 as described, for example, in FIG. 3. Further, the control circuitry 202 may be further configured to detect the first user 112A in the bed of the bedroom 410 (or any other room), based on the captured images of the first user 112A. The control circuitry 202 may be configured to determine the position of the first user 112A in the bed based on the images of the first user 112A captured over a predetermined period of time. In some embodiments, the control circuitry 202 may be further configured to determine that the position of the first user 112A has not changed over the predetermined period of time to detect the sleep state of the first user 112A. Further, the control circuitry 202 may be configured to determine the sleep time-zone of the first user 112A based on the detection of the sleep time-zone of the first user 112A.

In other embodiments, the first electronic apparatus 110A (for example the smart watch) may be configured to acquire biological information of the first user 112A. The biological information may correspond to, for example, heart rate information, pulse rate information, and the like associated with the first user 112A. The first electronic apparatus 110A may be configured to detect whether the first user 112A is asleep or in the sleep state based on the acquired biological information. Further, the first electronic apparatus 110A may be configured to transmit information associated with the sleep time-zone to the control device 102 based on the detection that the first user 112A is asleep. Further, the control circuitry 202 may be configured to set the sleep time-zone (or timing mode) of the first user 112A based on the received information from the first electronic apparatus 110A associated with the first user 112A. Thus, the control device 102 may be configured to determine the sleep time-zone and/or sleep mode associated with the first user 112A (or any of the plurality of users 112A-112N) using different techniques.

In accordance with an embodiment, the control circuitry 202 may be further configured to detect the presence of the first user 112A within the first physical space 106A, for example, the family room 408. The detailed operations or techniques for the detection of the presence of the first user 112A are described, for example, in FIG. 3. The control circuitry 202 may be further configured to identify the first user 112A based on the detection of the presence of the first user 112A within the first physical space 106A. The control circuitry 202 may identify or recognize the first user 112A based on the images of the first user 112A captured by the image capturing device 302 or the image capturing device 314 of the first electronic apparatus 110A. The control circuitry 202 may recognize the first user 112A from the captured images based on different face recognition techniques. The detailed implementation of the face recognition techniques may be known to one skilled in the art, and therefore, a detailed description for the face recognition techniques has been omitted from the disclosure for the sake of brevity.

In accordance with an embodiment, based on the detection of the first user 112A within the first physical space 106A (for example the family room 408), the control circuitry 202 may be configured to capture the second timing information (for example actual time of detection of the first user 112A) as described, for example, in FIGS. 1 and 3. The control circuitry 202 may be further configured to compare the first timing information (the time-zone 402 or the plurality of time-zones as per the Table 1) stored in the memory 204 with the second timing information. The control circuitry 202 may be further configured to determine a time-zone from the plurality of time-zones based on the comparison. The determined time-zone may correspond to the current time of the detection of the first user 112A within the first physical space 106A. For example, in case the second timing information is "6:00 PM", then the control circuitry 202 may determine the time-zone as the "evening" time-zone as the current time-zone.

The control circuitry 202 may be further configured to determine a first operational mode based on the determined time-zone (for example, the "evening" time-zone), for the operations of each of the first set of electrical devices 108A-108C associated with the first physical space 106A (such as the family room 408). In some embodiments, the first operational mode may be one of the first plurality of operational modes and defined in advance in the first device operational information for each of the first set of electrical devices 108A-108C present in or associated with the first physical space 106A for different time-zones. For examples, for the first set of electrical devices 108A-108C (the lights 310A and 310B, the blinds 312, the TV 306, and the fan 304) associated with the first physical space 106A (i.e. the family room 408), the determined first operational mode for the "evening" time-zone may be 70%" brightness for the lights 310A and 310B, "half open" for the blinds 312, "ON" with high volume or brightness for the TV 306, and "High" speed for the fan 304.

The control circuitry 202 may be further configured to control the operations of each of the first set of electrical devices 108A-108C associated with the first physical space 106A (such as the family room 408) in the "evening" time-zone based on the determined first operational mode. Several other scenarios of the first operational mode for the plurality of electrical devices 108A-108N are illustrated in FIG. 4A for different combinations of user presence in the plurality of physical spaces 106A-106N and the plurality of time-zones.

In an exemplary scenario, the first operational mode of the ventilator 308 in the kitchen 414 may be turned to "High" in the morning mode, because the first user 112A may cook in the morning as shown in FIG. 4A.

In another exemplary scenario, in a case the first user 112A enters the study room 412, the first operational mode of the lights 310A and 310B in the study room 412 may be set brighter in comparison to another cases when the first user 112A may enter the other rooms in the premises 104 as shown in FIG. 4A.

In another exemplary scenario, the first operational mode of the ventilator 308 of each of the bedroom 410 and the bathroom 416 may turned to "Low" speed in the sleep time-zone as shown in FIG. 4A.

In another exemplary scenario, even in the sleep mode, the first operational mode of the lights 310A and 310B in the outside space 418 (e.g. front yard) may be set at "100%" brightness for the safety of the plurality of users 112A-112N as shown in FIG. 4A.

In another exemplary scenario, in case the first user 112A is in the bedroom 410 and is in the sleep time-zone, the first operational mode of the lights 310A and 3106 may be maintained at "10%" brightness, even if the entry of the second user 112B is detected in the bedroom 410. The 10% brightness in the sleep time-zone may be lower as compared to other time-zones (for example "early-morning", "morning", "evening", or "night") in the bedroom 410 as shown in FIG. 4A.

In another exemplary scenario, in the night time-zone, the brightness of the lights 310A and 310B, the volume/brightness of the TV 306, and the speed of the ventilator 308 or the fan 304 in the bedroom 410 may be set lower than in other areas of the premises 104 as shown in FIG. 4A.

It may be noted that the time-zones 402, and the plurality of operational modes defined for the plurality of electrical devices 108A-108N in the plurality of physical spaces 106A-106N, shown in FIG. 4A, are presented merely an example. However, in some embodiments, there may be different examples of the time-zones 402, and the plurality of operational modes defined for the plurality of electrical devices 108A-108N, without limiting the scope of the disclosure.

In accordance with an embodiment, the memory 204 may be further configured to store second device operational information. The second device operational information may indicate an association between the first timing information (the plurality of time-zones in Table 1 and FIG. 4A) and a second plurality of operational modes for each of the second set of electrical devices 108D-108F associated with the second physical space 106B. The second physical space 1066 (for example the study room 412) may be different from the first physical space 106A (for example the family room 408). The second plurality of operational modes may correspond to modes of operation of each of the second set of the electrical devices 108D-108F located within the second physical space 106B. The second set of the electrical devices 108D-108F associated with the second physical space 106B may be same or different from the first set of electrical devices 108A-108C associated with the first physical space 106A. For example, the lights 310A and 310B may be present in each of the first physical space 106A and the second physical space 106B, however, the TV 306, for example, may not be present in the second physical space 106B (such as the study room 412). Therefore, the first plurality of operational modes for the first set of electrical devices 108A-108C may be different for the second plurality of operational modes for the second set of the electrical devices 108D-108F in a particular time-zone.

More specifically, the control circuitry 202 may be configured to detect movement of the first user 112A from the first physical space 106A (for example, the family room 408) to the second physical space 106B (for example the study room 412). The control circuitry 202 may be configured to detect the presence of the first user 112A within the second physical space 106B (i.e. the study room 412) based on techniques as described, for example, in FIG. 3. Based on the detected presence of the first user 112A within the second physical space 106B (i.e. the study room 412), the control circuitry 202 may be further configured to capture the second timing information (i.e. time of detection of the first user 112A within the second physical space 106B). The control circuitry 202 may be configured to compare the stored first timing information (i.e. time zones) with the captured second timing information.

The control circuitry 202 may be further configured to determine a second time-zone from the plurality of time-zones based on the comparison, and further determine a second operational mode from the second plurality of operational modes for each of the second set of the electrical devices 108D-108F based on the determined time-zone. The association between the determined second time-zone and the second operational mode for each of the second set of the electrical devices 108D-108F in the second physical space 106B may be indicated by the second device operational information already stored in the memory 204. The second device operational information may be set in the memory 204 in advance by the first user 112A. The control circuitry 202 may be further configured to control each of the second set of the electrical devices 108D-108F associated with the second physical space 106B (i.e. the study room 412) based on the determined corresponding second operational mode in the determined time-zone.

As an example, in case the captured second timing information is "5:30 PM", the control circuitry 202 may determine the second time-zone as "evening" time-zone. The control circuitry 202 may be further configured to determine the second operational mode for each of the second set of the electrical devices 108D-108F associated with the second physical space 106B (i.e. the study room 412) in the "evening" time-zone. As shown in FIG. 4A, for the study room 412 in the "evening" time-zone, the second operational mode for the fan 304 or ventilator 308 may be "high" speed, the blinds 312 may be "half open" state, and the lights 310A and 310B may be "70%" bright. Thus, based on the movement of the first user 112A from one room to a new room (for example the family room 408 to the study room 412), the plurality of operational modes of the corresponding set of electrical devices may be automatically controlled based on the detection of movement of the first user 112A within the new room and timing of the detection. The relationship or associated between the timing (as time-zones) and the plurality of operational modes for the corresponding set of electrical devices may be stored in advance (or predefined by the first user 112A) as the first device operational information or the second plurality of operational modes.

With respect to FIGS. 3 and 4A, when each of the first set of electrical devices 108A-108C associated with the first physical space 106A (such as the family room 408) is controlled based on the first operational mode, the control circuitry 202 may be further configured to detect the presence of the second user 112B associated with the second electronic apparatus 110B in the first physical space 106A (such as the family room 408) based on detection techniques described, for example, in FIG. 3. Based on the detected presence of the second user 112B in the first physical space 106A (such as the family room 408), the control circuitry 202 may be further configured to update the first operational mode for at least one of the first set of electrical devices 108A-108C associated with the first physical space 106A (such as the family room 408). For example, the lights 310A and 310B of the family room 408 may be updated to "90%" brightness (from 70% brightness as shown in FIG. 4A for the "evening" time-zone) based on the detected presence of the second user 112B in the first physical space 106A (such as the family room 408). The updated first operational mode may be stored in the first device operational information, where the updated first device operational information may be specific to the second user 112B.

In some embodiments, the memory 204 may be configured to store user specific operational mode information. The plurality of electrical devices 108A-108N may be controlled differently for different users based on the user specific operational mode information. In such cases, the control circuitry 202 may be configured to determine the first operational mode for one of the rooms (for example a first bedroom) based on the detection of the first user 112A in the first bedroom and further determine the second operational mode for the first bedroom, based on the detection of the second user 112B in the first bedroom. Similarly, the control device 102 may be configured to determine different operational modes for each user of the plurality of user 112A-112N and for the plurality of electrical devices 108A-108N in different physical spaces (such as the living room 406, the study room 412, etc.).

In some cases, the memory 204 may be configured to store priority information associated with the first user 112A and the second user 112B. The control circuitry 202 may be configured to update the first operational mode based on the priority information. The control circuitry 202 may be further configured to compare the priority information associated with the first user 112A and the priority information associated with the second user 112B to update the first operational mode. For example, the first user 112A may have a higher priority than the second user 112B and the first user 112A may be sleeping in the first physical space 106A (say the family room 408). In such case, the first operational mode may be set for the first set of electrical devices 108A-108C associated with the family room 408 in accordance with the detection of the presence of the first user 112A in the sleep time-zone. Further, when the second user 112B enters the first physical space 106A (such as the family room 408), the control circuitry 202 may be configured to detect the presence of the second user 112B in the family room 408, as described, for example, in FIG. 3. The control circuitry 202 may be configured to compare the stored priority information associated with the second user 112B with the stored priority information associated with the first user 112A. In case, the first user 112A may have higher priority than the second user 112B, the control circuitry 202 may be further configured to continue control of the first set of electrical devices 108A-108C in the sleep time-zone based on the set first operational mode. Accordingly, the control circuitry 202 may be further configured not to change the first operational mode in the family room 408, since the first user 112A may have the higher priority than the second user 11B.

In case, the first user 112A may have a lower priority than the second user 112B, the control circuitry 202 may be further configured to update the control of the first set of electrical devices 108A-108C based on the set operational mode for the second user 112B. For example, in case the second user 112B is an old-age person with higher priority than the first user 112A (for example a kid), then the first operational mode for the first set of electrical devices 108A-108C in the first physical space 106A (such as the family room 408) may be updated, like the lights 310A and 310B may be more brighter, or the volume of the TV 306 may be more louder, based on the detection of the second user 112B in a room where the first user 112A is already present or detected. Thus, the disclosed control device 102 may automatically change operational modes for at least one of the plurality of electrical devices 108A-108N associated with the plurality of physical spaces in the premises 104 based on the user presence and the stored timing information (such as the first device operational information or the second device operational information.

FIG. 4B is explained in conjunction with elements from FIGS. 1, 2, 3, and 4A. With reference to FIG. 4B, there is shown a second scenario in a table 400B. The table 400B is similar to the table 400A. The table 400B includes the plurality of columns which may indicates the time-zones (or timing modes) 402, the user's location 404, the plurality of electrical devices 108A-108N as also described in FIG. 4A. There is further shown another column as a transition time 420 associated with the plurality of operational modes of the plurality of electrical devices 108A-108N in each of the plurality of physical spaces 106A-106N. The transition time 420 may indicate a change in the first operational mode or the second operational mode of each corresponding electrical device of the plurality of electrical devices 108A-108N based on the determination of presence or absence of the plurality of users 112A-112N.

In accordance with an embodiment, the memory 204 may be configured to store the transition time 420 for the first operational mode or the second operational mode for each combination of the plurality of electrical devices 108A-108N and the time-zones. The control circuitry 202 may be configured to set a specific time interval (as a transition period) in the transition time 420 for the first operational mode or the second operational mode for the plurality of electrical devices 108A-108N. In some cases, the transition period may be set based on the user input provided by the first user 112A, via the first electronic apparatus 110A, or set by the manufacturer of the control device 102.

The transition period may be associated with a time period that may start to elapse after the detection of the movement of the first user 112A from one physical space, (for example from the family room 408 to another physical space, like the study room 412) or after the movement of the first user 112A out of the physical space. The control circuitry 202 may be configured to detect the movement of the first user 112A from or out of the first physical space 106A as described, for example, in FIG. 4A. In accordance with an embodiment, the control circuitry 202 may be further configured to change the first operational mode of each of the first set of electrical devices 108A-108C of the first physical space 106A (for example the study room 412) from where the first user 112A may have moved out (i.e absence in the first physical space 106A). Based on the detection of the movement from the first physical space 106A, the control circuitry 202 may be configured to determine a third operational mode from the first plurality of operational modes of the first set of electrical devices 108A-108C present in the first physical space 106A (for example the study room 412). The third operational mode may be different from the first operational mode for at least one of the first set of electrical devices 108A-108C in the first physical space 106A. The control circuitry 202 may be configured to change the operational modes of at least one of the first set of electrical devices 108A-108C from the first operational mode to the third operational mode because the first user 112A may have moved out of the first physical space 106A (for example the study room 412).

In an example, in case the first user 112A moves out of the study room 412 in the "evening" time-zone, the control circuitry 202 may change the first operational mode (for example 100% brightness as shown in FIG. 4A) of the lights 310A and 310B to the third operational mode (for example 70% brightness as shown in FIG. 4B). Similarly, in the "morning" time-zone in the study room 412, the first operational mode (for example 70% brightness as shown in FIG. 4A) of the lights 310A and 310B is changed to the third operational mode (for example 30% brightness as shown in FIG. 4B) based on the detection of the movement of the first user 112A from the first physical space 106A (for example the study room 412). Similarly, in the "early-morning" time-zone in the study room 412, the first operational mode (for example 100% brightness as shown in FIG. 4A) of the lights 310A and 310B is changed to the third operational mode (for example 50% brightness as shown in FIG. 4B) based on the detection of the movement of the first user 112A from the first physical space 106A (for example the study room 412). The brightness of the lights 310A and 310B may be reduced based on the detection of the movement of the first user 112A from the first physical space 106A to save energy consumption.

In accordance with an embodiment, after the control of the first set of electrical devices 108A-108C based on the third operational mode, the control circuitry 202 may be further configured to determine a fourth operational mode from the first plurality of operational modes for the first set of electrical devices 108A-108C based on the transition period set in the transition time 420. The transition time 420 (or the transition period) may indicate the time period after which the first set of electrical devices 108A-108C may change the third operational mode to the fourth operational mode. In some embodiments, the third operational mode may be different from the fourth operational mode for at least one of the first set of electrical devices 108A-108C associated with the first physical space 106A. For example, in case, the first user 112A remain absent or moved out from the first physical space 106A (for example the study room 412) for the transition time (say for 2 mins for the time-zone such as "early-morning" time-zone as shown in FIG. 4B), the control circuitry 202 may change the third operational mode (e.g. 50% brightness) of the lights 310A and 310B to the fourth operational mode (e.g. turn-off or a sleep state) of the lights 310A and 310B. Thus, based on the detection of absence of a user from a particular physical area for the set transition period, the control circuitry 202 further change the operational mode or turn-off the plurality of electrical devices 108A-108N to further save the energy consumption.

FIG. 4C is explained in conjunction with elements from FIGS. 1, 2, 3, 4A, and 4B. With reference to FIG. 4C, there is shown a third scenario in a table 400C. The table 400C is similar to the table 400A. Therefore, the description of the table 400C has been omitted from the disclosure for the sake of brevity. The memory 204 may be configured to store an operational mode of the plurality of operational modes based on exit of the first user 112A and/or the second user 112B from each of the plurality of physical spaces 106A-106N. The control device 102 or the first user 112A may set the operational mode of the plurality of electrical devices 108A-108N in the memory 204. Examples of the operational mode in such exit situation, may include, but are not limited to, turn-off the fan 304, turn-off the TV 306, the lights 310A and 310B at "0%" brightness during the afternoon time-zone and at "20%" brightness during "night" time-zone of the each of the plurality of areas in the premises 104 as shown in FIG. 4C.

In case, the first user 112A and/or the second user 112B exits from one of the plurality of areas of the user's location 404, the control circuitry 202 may be configured to determine the exit or the out-movement of the first user 112A and/or the second user 112B from the plurality of areas. In an example, the first electronic apparatus 110A associated with the first user 112A and/or the second electronic apparatus 110B associated with the second user 112B may be configured to transmit the geo-location information corresponding to the detected location to the control circuitry 202 as described, for example, in FIG. 3. In accordance with the received geo-location information, the control circuitry 202 may be configured to determine the exit of the first user 112A and/or the second user 112B from each of the plurality of physical spaces 106A-106N of the premises 104. In another example, the presence sensing device 322 may be configured to detect absence/exit of the first user 112A and/or the second user 112B from the first physical space 106A (for example the living room 406), and transmit the information corresponding to the detected absence to the control circuitry 202. In accordance with the received information, the control circuitry 202 may be configured to determine the exit of the first user 112A and/or the second user 112B from the living room 406, and set the operational modes of the plurality of electrical devices 108A-108N as shown in FIG. 4C.

In response to the determination of the exit of the first user 112A and/or the second user 112B from each of the plurality of physical spaces 106A-106N, the control circuitry 202 may be further configured to determine the operational mode (for example an exit operational mode) for the plurality of electrical devices 108A-108N associated with each of the plurality of physical spaces 106A-106N. The control circuitry 202 may be configured to control the plurality of electrical devices 108A-108N based on the determined operational mode (i.e. the exit operational mode). As shown in FIG. 4C, for example, the exit operational mode may be "0" brightness for the lights 310A and 310B in each of the time-zones 402 (except "night" time-zone) for each of the plurality of physical spaces 106A-106N. In another example, the exit operational mode may be "OFF" state for the TV 306 for each of the plurality of physical spaces 106A-106N in each of the time-zones 402.

FIG. 4D is explained in conjunction with elements from FIGS. 1, 2, 3, 4A, 4B, and 4C. With reference to FIG. 4D, there is shown a fourth scenario in a table 400D. The table 400D includes a plurality of columns which may indicate the time-zones 402, the user's location 404, the plurality of electrical devices 108A-108N as described, for example, in FIG. 4A. There is further shown another column which may indicate mode information 422 in the table 400D.

In accordance with an embodiment, the memory 204 may be configured to store the mode information 422 associated with the first user 112A and/or the second user 112B. The mode information 422 may include a plurality of user profiles associated with the first user 112A and/or the second user 112B. Examples of the plurality of user profiles may include, but are not limited to, a business mode, a welcome mode, a family mode, a friend mode, an office mode, a workout mode, a sleep mode, a party mode, a movie mode, or a guest mode. The first device operational information stored in the memory 204 for the first physical space 106A may further indicate a second association between the mode information 422 and the first plurality of operational modes for each of the first set of electrical devices 108A-108C. In some embodiments, the memory 204 may further include association between the mode information 422 and corresponding plurality of operational modes for each of the plurality of electrical devices 108A-108N associated with each of the plurality of physical spaces 106A-106N in the premises 104.

In accordance with an embodiment, the mode information 422 for each time-zones 402 may be defined in advance by the first user 112A/the second user 112B or by the manufacture in the first device operational information stored in the memory 204. For example, as shown in FIG. 4D, the first user 112A may define the "Afternoon" time-zone as the office mode or the business mode (i.e. one of the user profiles) because the first user 112A may be engaged in the official or business activities (like business meetings) in the plurality of physical spaces 106A-106N during the "Afternoon" time-zone. In another example, the first user 112A may define the "evening" time-zone as the workout mode, the welcome mode or the guest mode (i.e. one of the user profiles) because the first user 112A may be engaged in the workout or engaged in hosting his/her family members or guest in the plurality of physical spaces 106A-106N during the "evening" time-zone (i.e. 5:00 PM-8:00 PM).

The control circuitry 202 may be configured to receive the user input from the first user 112A (or the second user 112B) to define the operational modes (e.g. first operational mode or the second operational mode) for the plurality of electrical devices 108A-108N in the plurality of physical spaces 106A-106N for each user profile. Thus, the second association, as shown in FIG. 4D, may be defined by the first user 112A in advance between the mode information 422 (or the plurality of user profiles) and the plurality of operational modes for each of the plurality of electrical devices 108A-108N in the plurality of physical spaces 106A-106N. This second association may be stored in the first device operational information (for the first physical space 106A) or in the second device operational information (for the second physical space 106B). As shown in FIG. 4D, for the first physical space 106A (for example the living room 406) and for different user profiles, the first operational mode may be defined for each of the first set of electrical devices 108A-108C. For example, for the workout mode (defined during the "evening" time-zone), the first operational mode for the lights 310A and 310B may be "70%" bright, the blinds 312 may be "half-open", the TV 306 may be "ON" with high volume, and/or the fan 304/ventilator 308 may be at "High" speed in the first physical space 106A (for example the living room 406).

It may be noted that the mode information 422, the time-zones 402, and the plurality of operational modes defined for the plurality of electrical devices 108A-108N in the plurality of physical spaces 106A-106N, shown in FIG. 4D, are presented merely an example. However, in some embodiments, there may be different examples of the mode information 422, the time-zones 402, and the plurality of operational modes defined for the plurality of electrical devices 108A-108N, without limiting the scope of the disclosure.

In accordance with an embodiment, the control circuitry 202 may be configured to determine the second time information (i.e. time of detection of the presence of the first user 112A in the first physical space 106A) as described, for example, in FIGS. 3 and 4A. The control circuitry 202 may be further configured to determine the user profile from the plurality of user profiles (i.e. mode information 422) based on the second time information. For example, in case, the presence of the first user 112A is detected in the living room 406 say at 10:00 PM, the control circuitry 202 may determine the user profile as movie mode or the party mode based on the association between the time-zones 402 and the mode information 422. The control circuitry 202 may further control the first set of electrical devices 108A-108C in the living room based on the determined user profile as shown in FIG. 4D.

In accordance with an embodiment, the first electronic apparatus 110A may be configured to receive calendar information, associated with a schedule of a day of the first user 112A. The calendar information may be manually input by the first user 112A, via a user interface (for example the display screen 510 shown in FIG. 5), of the first electronic apparatus 110A. In some embodiments, the first electronic apparatus 110A may receive the calendar information associated with the first user 112A from the server 114 where information about the schedules of the first user 112A may be stored. The schedules of the first user 112A may include frequency/date of occurrence, and timings. In some embodiment, the calendar information (i.e. the schedule) may be associated with the plurality of user profiles.

Examples of associations between the user profiles and the calendar information are presented in Table 2, as follows:

TABLE 2

Association between user profiles and calendar information

| User Profiles | Calendar Information | |
|---|---|---|
| | Frequency/Date of Occurrence | Timing |
| Sleep | Daily | 11:00 PM-6:00 AM |
| Workout | Daily | 6:00 AM-7:00 AM |
| Family | Daily | 7:00 AM-9:00 AM |
| Office | Weekdays | 9:00 AM-6:00 PM |
| Welcome | DD/MM/YYYY | 6:00 PM-7:00 PM |
| Party | DD/MM/YYYY | 7:00 PM-10:00 PM |

For example, the first user 112A may go to the office for weekdays of every week. Accordingly, the user profile "Office" may be associated with "weekdays" and the office timings may be set as "9:00 AM-6:00 PM". The control circuitry 202 may be configured receive the association between the calendar information and the user profiles from the first electronic apparatus 110A. In some embodiments, the control circuitry 202 may change the calendar information and the association with the plurality of user profiles based on user inputs received via the first electronic apparatus 110A. In some embodiments, the association between the calendar information and the user profiles may be stored in advance in the first device operational information or the second device operational information to control the first set of electrical devices 108A-108C in the first physical space 106A or the second set of the electrical devices 108D-108F in the second physical space 106B.

The control circuitry 202 may be configured to receive the schedule (for example new upcoming meeting) associated with the first user 112A from the first electronic apparatus 110A in response to the detection of the presence of the first user 112A in one of the plurality of physical spaces (for example the first physical space 106A). Alternatively, the first user 112A may transmit the schedule for the new upcoming meeting to the control device 102 prior to the detection of the presence of the first user 112A. The control circuitry 202 may be further configured to determine a user profile from the plurality of user profiles associated with the first user 112A, based on the received calendar information or the schedule. The control circuitry 202 may determine the user profile from the stored association between the plurality of user profiles and the calendar information. For example, in case the upcoming meeting is schedule at, for example, at 1:00 PM, then the control circuitry 202 may determine the user profile as the office mode based on the comparison of the received calendar information (or schedule) and the association stored in the Table 2. The control circuitry 202 may be further configured to determine the first operational mode of the plurality of operational modes based on the determined user profile as described, for example, in FIG. 4D. In accordance with the embodiment, based on determined first operational mode, the control circuitry 202 may be configured to control the first set of the plurality of electrical devices 108A-108N in response to the detection of the first user 112A in the first physical space 106A as described, for example, in FIG. 4D.

As an example, the first user 112A may input the calendar information (or the schedule) to the first electronic apparatus 110A. The input may be to set a party, for example, "from 7:00 PM to 10:00 PM on particular data in DD/MM/YYYY format in the living room 406". The control circuitry 202 may be configured to receive the calendar information from the first electronic apparatus 110A and store the calendar information in the memory 204. When the presence of the first user 112A is detected in the living room 406 at 7:00 PM, the control circuitry 202 may be configured to determine the party mode (as the user profile) based on the detection of the presence of the first user 112A in the living room 406 and the comparison of the received calendar information and the association described in Table 2. Further, the control circuitry 202 may be configured to control the first set of electrical devices 108A-108C associated with the first physical space 106A (i.e. the living room 406) based on the first operational mode associated with the party mode. For example, in the party mode in the living room 406, the lights 310A and 310B may be "100%" bright, the TV 306 may be "ON" at high volume as shown in FIG. 4D.

In accordance with an embodiment, the control circuitry 202 may be configured to receive electronic program guide (EPG) information associated with the TV 306 of the first user 112A from the server 114. The memory 204 may be configured to store the received EPG information. The EPG information may include information associated with scheduled media programs (for example a favorite or preferred movie content of the first user 112A) that may be rendered on the TV 306 of the first user 112A. The schedule of the programs may correspond to the first timing information (i.e. the time-zones 402) shown in FIG. 4D.

The control circuitry 202 may be configured to detect the presence of the first user 112A in the first physical space 106A (for example the living room 406). The details of the detection of the presence of the first user 112A are described, for example, in FIG. 3. In response to detection of the first user 112A in the first physical space 106A, the control circuitry 202 may be configured to compare the EPG information (schedule of the favorite or preferred movie content) with the time-zones 402, and further determine the user profile from the plurality of user profiles, for example, the movie mode may be determined for the living room 406 as per the EPG information. In accordance with the determined movie mode, the control circuitry 202 may be configured to control the first set of electrical devices 108A-108C of the first physical space 106A (i.e. the living room 406) based on the second association defined in the first device operational information between the mode information 422 and the first plurality of operational modes of each of the first set of electrical devices 108A-108C in the first physical space 106A (i.e. the living room 406). For example, the control circuitry 202 may be configured to control the TV 306 of the living room 406 such that a movie that corresponds to one of the favorite movies of the first user 112A may be played on the TV 306. This may enhance user experience, since the control device 102 automatically renders desired movie content on the TV 306 at predefined operational mode in accordance with the interests and timings set for the first user 112A.

Figure 5:
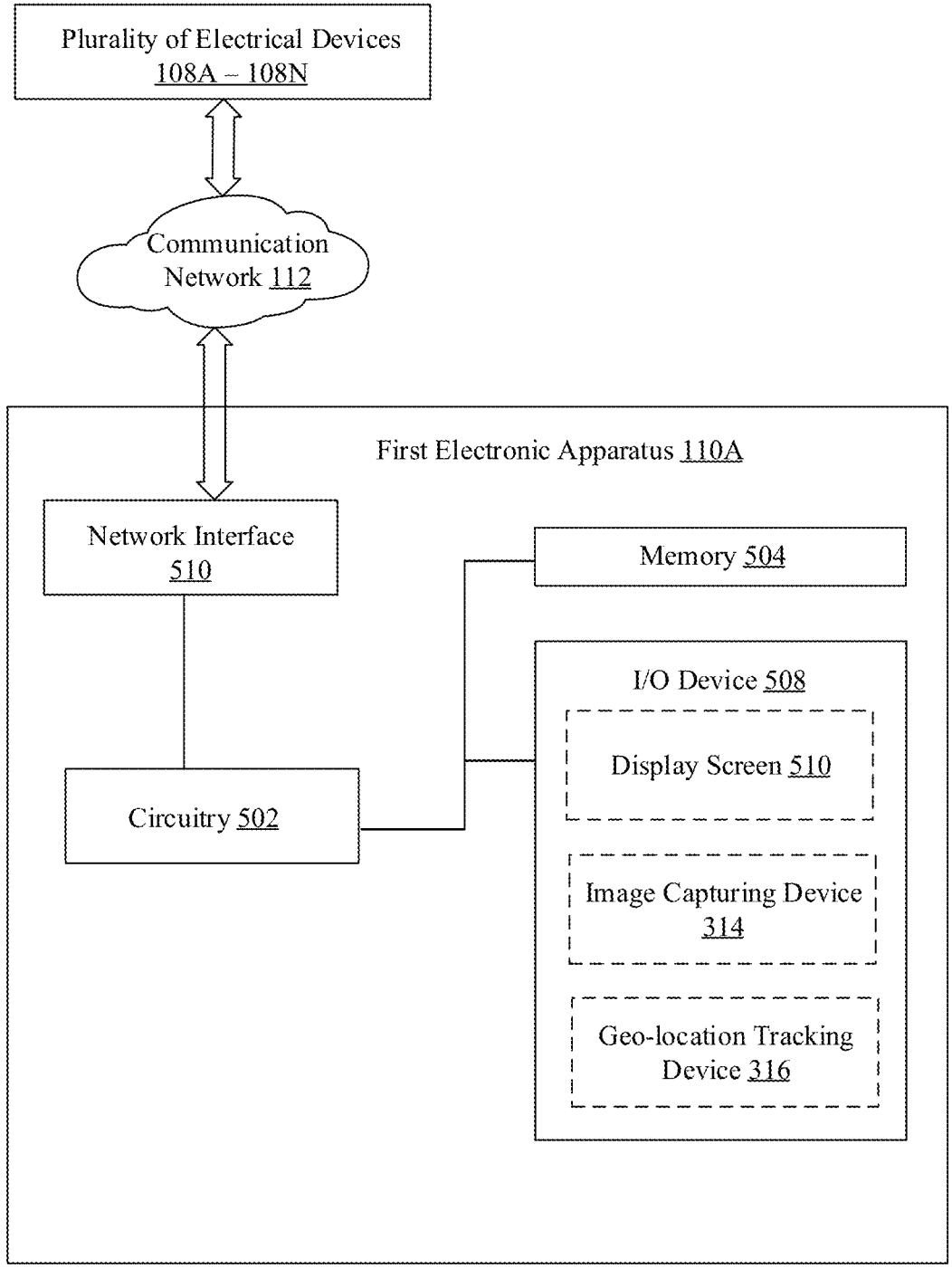
FIG. 5 illustrates a block diagram of an exemplary electronic apparatus to control electrical devices within a physical space based on timing information, in accordance with an embodiment of the disclosure.

FIG. 5 is a block diagram that illustrates an exemplary electronic apparatus to control electrical devices within a physical space based on timing information, in accordance with an embodiment of the disclosure. FIG. 5 is explained in conjunction with elements from FIG. 1. With reference to FIG. 5, there is shown a block diagram 500 of an electronic apparatus (for example the first electronic apparatus 110A). The first electronic apparatus 110A may include circuitry 502, a memory 504, a network interface 506, and an input/output (I/O) device 508. The I/O device 508 may include a display screen 510, the image capturing device 314, and the geo-location tracking device 316. The circuitry 502 may be communicatively coupled to the memory 504, the network interface 506, and the I/O device 508. The circuitry 502 may be also configured to communicate with the plurality of electrical devices 108A-108N and the control device 102, through the network interface 506 and the communication network 116 shown in FIG. 5.

The functions of the circuitry 502, the memory 504, the network interface 506, the input/output (I/O) device 508, and the display screen 510 shown in FIG. 5 may be same as the functions of the control circuitry 202, the memory 204, the network interface, 206, the I/O device 208, and the display screen 210 described, for example, in FIGS. 2, 3, 4A-4D. Therefore, the description of the circuitry 502, the memory 504, the network interface 506, the input/output (I/O) device 508, and the display screen 510 is omitted from the disclosure for the sake of brevity. The image capturing device 314 of the first electronic apparatus 110A may be configured to capture the images of at least one object or the first user 112A present within the first physical space 106A. The geo-location tracking device 316 of the first electronic apparatus 110A may be configured to detect the geo-location (i.e. GPS location) of the first electronic apparatus 110A of the first user 112A. The first electronic apparatus 110A may be configured to detect the presence of the first user 112A in the first physical space 106A through one or both the image capturing device 314 and the geo-location tracking device 316 as described, for example, in FIGS. 3 and 4A.

In operation, the memory 504 of the first physical space 106A may be configured to store the first device operational information which may indicate the first association between the first timing information (i.e. time-zones 402) and the first plurality of operational modes for each of the first set of electrical devices 108A-108C in the first physical space 106A as described, for example, in FIGS. 1, 3, and 4A. In some embodiments, the memory 504 may store the association between the first timing information (i.e. time-zones 402) and the operational modes for each of the plurality of electrical devices 108A-108N in the plurality of physical spaces 106A-106N in the premises 104.

The circuitry 502 of the first electronic apparatus 110A may be further configured to detect the presence of the first user 112A within the first physical space 106A through the image capturing device 314 and the geo-location tracking device 316 as described, for example, in FIGS. 3 and 4A. The circuitry 502 may be further configured to determine the first operational mode for each of the first set of electrical devices 108A-108C based on the detection as described, for example, in FIG. 4A. In accordance with an embodiment, the circuitry 502 may be further configured to control each of the first set of electrical devices 108A-108C (for example the lights 310A and 310B, the TV 306, the blinds 312, or the fan 304) based on the determined first operational mode for each of the first set of electrical devices 108A-108C as described, for example, in FIG. 4A.

It may be noted that the functionality of the first electronic apparatus 110A may also be applicable to other electronic apparatus (for example the second electronic apparatus 110B of the second user 112B) present or associated with the plurality of electrical devices 108A-108N in the premises 104. The configurations and operations of the second electronic apparatus 110B may be similar to the first electronic apparatus 110A. Accordingly, the details of the second electronic apparatus 110B is omitted from the disclosure for the sake of brevity.

The disclosed first electronic apparatus 110A may facilitate the first user 112A with the capability to configure operational modes of the plurality of electrical devices 108A-108N associated with the plurality of physical spaces 106A-106N based on different schedules (i.e. timing information as the time-zones) of the first user 112A. This may further enhance functionality of the first electronic apparatus 110A to automatically control the operational modes of the plurality electrical devices 108A-108N based on the defined schedules of the first user 112A.

Figure 6:
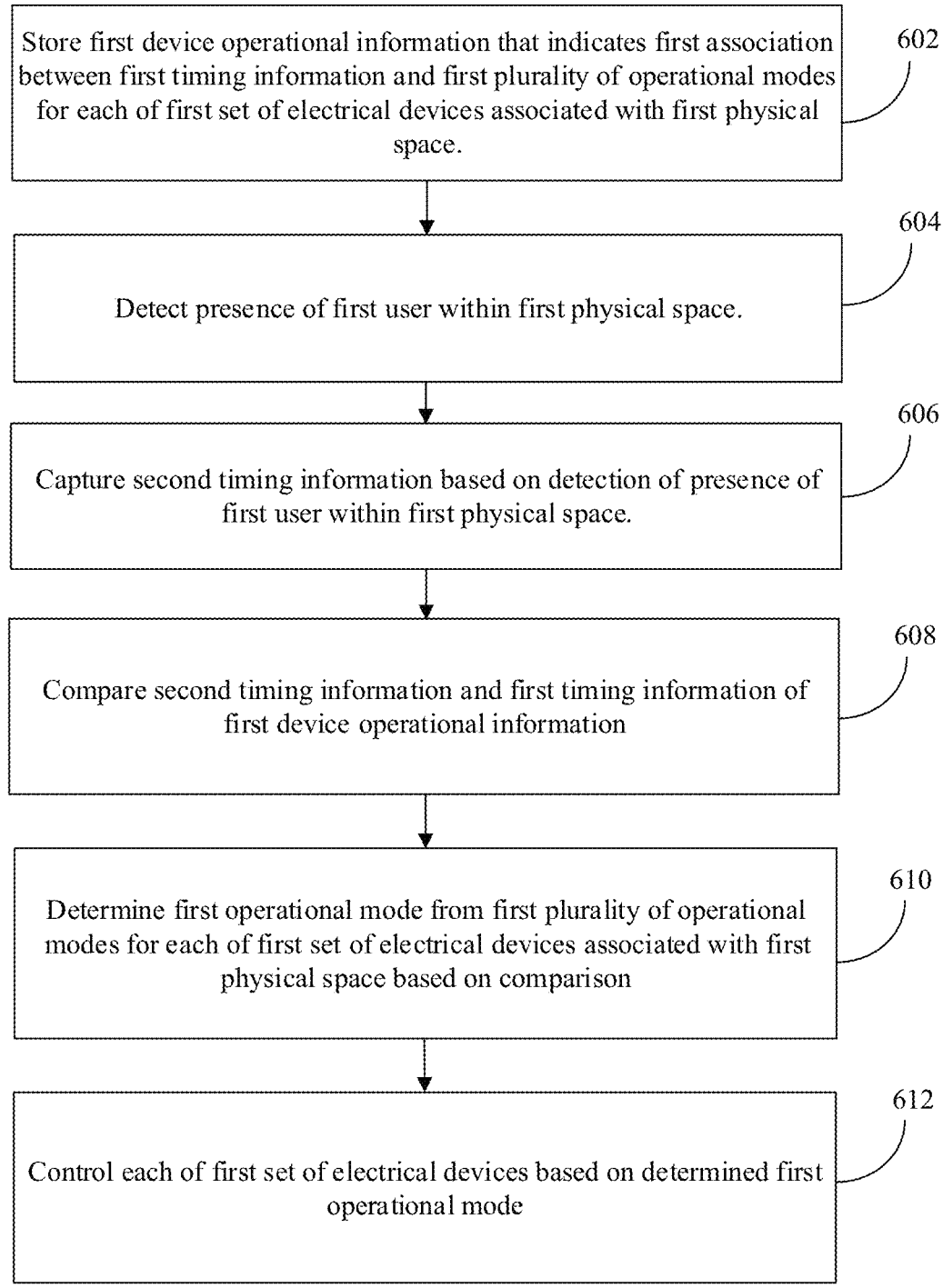
FIG. 6 illustrates a flowchart of an exemplary method for providing control of electrical devices based on timing information, in accordance with an embodiment of the disclosure.

FIG. 6 illustrates a flowchart of an exemplary method for providing control of electrical devices based on timing information, in accordance with an embodiment of the disclosure. FIG. 6 is explained in conjunction with elements from FIGS. 1, 2, 3, 4A, 4B, 4C, 4D, and 5. With reference to FIG. 6, there is shown a flowchart 600 that depicts a method for control of the plurality of electrical devices 108A-108N based on the timing information (or the time-zones) set in advance by a user (for example the first user 112A). Any computing device, for example, the control device 102 that may include the control circuitry 202 or the circuitry 502 of the first electronic apparatus 110A, may execute operations specified in the method. The method illustrated in the flowchart 600 may start from 602.

At 602, the first device operational information may be stored. The first device operational information may indicate the first association between the first timing information and the first plurality of operational modes for each of the first set of electrical devices 108A-108C associated with the first physical space 106A. The first association between the first timing information and the first plurality of operational modes for each of the first set of electrical devices 108A-108C is described, for example, in FIGS. 1, 4A, 4B, and 4C.

At 604, the presence of the first user 112A within the first physical space 106A may be detected. In accordance with an embodiment, the control circuitry 202 or the circuitry 502 may be configured to detect the presence of the first user 112A within the first physical space 106A. The first user 112A may be associated with the first electronic apparatus 110A. The detection of the presence of the first user 112A within the first physical space 106A is described, for example, in FIGS. 3 and 5.

At 606, the second timing information may be captured based on the detection of the presence of the first user 112A within the first physical space 106A. The second timing information may correspond to the time when the first user 112A may be detected within the first physical space 106A. In accordance with an embodiment, the control circuitry 202 or the circuitry 502 may be configured to capture the second timing information as described, for example, in FIGS. 1, 4A, 4B, and 4C.

At 608, the second timing information and the first timing information of the first device operational information may be compared. In accordance with an embodiment, the control circuitry 202 or the circuitry 502 may be configured to compare the second timing information with the first timing information as described, for example, in FIG. 4A.

At 610, the first operational mode from the first plurality of operational modes may be determined for each of the first set of electrical devices 108A-108C associated with the first physical space 106A based on the comparison. The control circuitry 202 or the circuitry 502 may be configured to determine the first operational mode for each of the first set of electrical devices 108A-108C based on the comparison as described, for example, in FIGS. 1, 4A, 4B, 4C, 4D, and 5.

At 612, each of the first set of electrical devices 108A-108C may be controlled based on the determined first operational mode. The control circuitry 202 or the circuitry 502 may be configured to control the first set of the electrical devices 108A-108C based on the determined first operational mode as described, for example, in FIGS. 1, 4A, 4B, 4C, 4D, and 5.

The flowchart 600 is illustrated as discrete operations, such as 602, 604, 606, 608, 610, and 612. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer for providing control of electrical devices based on timing information. The set of instructions may be executable by the machine and/or the computer (for example the control device 102) to execute the steps that may comprise storing of first device operational information which may indicate a first association between first timing information and a first plurality of operational modes for each of a first set of electrical devices associated with a first physical space. The set of instructions may be executable by the machine and/or the computer to further execute the steps comprising detecting a presence of a first user within the first physical space. The first user may be associated with a first electronic apparatus. The set of instructions may be executable by the machine and/or the computer to further execute the steps comprising comparing second timing information captured at a time of the detection of the presence of the first user with the first timing information of the first device operational information. The set of instructions may be executable by the machine and/or the computer to further execute the steps comprising determining a first operational mode from the first plurality of operational modes for each of the first set of electrical devices associated with the first physical space, based on the comparison. The set of instructions may be executable by the machine and/or the computer to further execute the steps comprising controlling each of the first set of electrical devices based on the determined first operational mode.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A control device, comprising:
   a memory configured to store first device operational information which indicates a first association between first timing information and a first plurality of operational modes for each of a first set of electrical devices associated with a first physical space; and
   control circuitry, coupled with the memory, configured to:
   receive at least one image, which includes an object present within the first physical space, from a first electronic apparatus associated with a first user, wherein the at least one image is captured by a first image capturing device of the first electronic apparatus;
   detect the presence of the first user within the first physical space based on the at least one image, including the object, received from the first electronic apparatus, wherein the object present within the first physical space includes one of: an electrical device of the first set of electrical devices, a furniture, or a picture frame;
determine, based on the detected presence of the first user within the first physical space, a first operational mode from the first plurality of operational modes for each of the first set of electrical devices associated with the first physical space;
control each of the first set of electrical devices based on the determined first operational mode and the first timing information;
detect a movement of the first user from the first physical space to a second physical space, wherein the second physical space is associated with a second set of electrical devices;
determine a third operational mode, from the first plurality of operational modes, for at least one electrical device of the first set of electrical devices associated with the first physical space, based on the detected movement of the first user from the first physical space;
control the at least one electrical device of the first set of electrical devices associated with the first physical space, based on the determined third operational mode and the first timing information; and
wherein the first physical space includes a second image capturing device, and wherein the control circuitry is further configured to:
control the second image capturing device to capture one or more images of an area in the first physical space based on a field-of view (FOV) of the second image capturing device;
detect an image of the first user in the captured one or more images; and
detect the presence of the first user within the first physical space based on the detected image.

2. The control device according to claim 1,
wherein the first timing information includes a plurality of time-zones,
wherein the determined first operational mode for a first electrical device of the first set of electrical devices is different from the determined first operational mode for a second electrical device of the first set of electrical devices for a first set of time-zones of the plurality of time-zones, and
wherein the control circuitry is further configured to:
compare second timing information, which is captured at a time of the detection of the presence of the first user, with the first timing information of the first device operational information, and
determine, based on the comparison, the first operational mode from the first plurality of operational modes for each of the first set of electrical devices associated with the first physical space.

3. The control device according to claim 1, wherein the first set of electrical devices comprises one of a lighting device, an audio rendering device, an audio-video rendering device, a fan, a blind, an electronic furniture, a circulation vent, or a heating, ventilation, and air conditioning (HVAC) system.

4. The control device according to claim 1, wherein the control circuitry is further configured to:
receive, from the first electronic apparatus, geo-location information of the first electronic apparatus; and
detect the presence of the first user within the first physical space based on the received geo-location.

5. The control device according to claim 1, wherein the first physical space includes a radio frequency (RF) device, and wherein the control circuitry is further configured to:
receive, from the RF device located in the first physical space, information about connection between the RF device and the first electronic apparatus associated with the first user; and
detect the presence of the first user within the first physical space based on the received information about the connection between the RF device and the first electronic apparatus.

6. The control device according to claim 1, wherein the first device operational information indicates a second association between mode information and the first plurality of operational modes for each of the first set of electrical devices associated with the first physical space, and wherein the mode information is associated with the first user.

7. The control device according to claim 6, wherein the mode information includes a plurality of user profiles associated with the first user, and wherein each of the plurality of user profiles comprises one of a business mode, a welcome mode, a family mode, a friend mode, an office mode, a workout mode, a sleep mode, a party mode, a movie mode, or a guest mode, and
wherein the control circuitry is further configured to control each of the first set of electrical devices based on the second association between a user profile of the plurality of user profiles and the first plurality of operational modes.

8. The control device according to claim 7, wherein the control circuitry is further configured to:
receive calendar information, associated with the first user, from the first electronic apparatus;
determine a first user profile from the plurality of user profiles based on the received calendar information;
determine the first operational mode from the plurality of operational modes based on the determined first user profile; and
control each of the first set of electrical devices based on the determined first operational mode.

9. The control device according to claim 7, wherein the control circuitry is further configured to determine a first user profile from the plurality of user profiles based on second timing information, which is captured at a time of the detection of the presence of the first user.

10. The control device according to claim 1,
wherein the memory is further configured to store second device operational information which indicates a second association between the first timing information and a second plurality of operational modes for each of the second set of electrical devices associated with the second physical space that is different from the first physical space, and
wherein the control circuitry is further configured to:
determine a second operational mode from the second plurality of operational modes for each of the second set of electrical devices associated with the second physical space based on the detected movement from the first physical space to the second physical space; and
control each of the second set of electrical devices based on the determined second operational mode,
wherein the determined second operational mode of at least one electrical device of the second set of electrical devices is different from the determined first operational mode of at least one electrical device of the first set of electrical devices.

11. The control device according to claim 1, wherein the control circuitry is further configured to:
- determine a fourth operational mode from the first plurality of operational modes for the at least one electrical device after a predetermined time interval; and
- control the at least one electrical device of the first set of electrical devices based on the fourth operational mode.

12. The control device according to claim 1, wherein the first operational mode and the third operational mode for the at least one electrical device are different from each other.

13. The control device according to claim 1, wherein the control circuitry is further configured to:
- detect a presence of a second user within the first physical space, wherein the second user is associated with a second electronic apparatus;
- update the determined first operational mode for an electrical device of the first set of electrical devices based on the detected presence of the second user; and
- control the electrical device based on the updated first operational mode for the electrical device.

14. The control device according to claim 13, wherein the control circuitry is further configured to update the determined first operational mode for the electrical device based on priority information associated with the second user.

15. A method, comprising:
in a control device:
- storing first device operational information which indicates a first association between first timing information and a first plurality of operational modes for each of a first set of electrical devices associated with a first physical space;
  - receiving at least one image, which includes an object present within the first physical space, from a first electronic apparatus associated with a first user, wherein the at least one image is captured by a first image capturing device of the first electronic apparatus;
  - detecting a presence of the first user within the first physical space based on the at least one image, including the object, received from the first electronic apparatus, wherein the object present within the first physical space includes one of: an electrical device of the first set of electrical devices, a furniture, or a picture frame;
  - determining, based on the detected presence of the first user within the first physical space, a first operational mode from the first plurality of operational modes for each of the first set of electrical devices associated with the first physical space;
  - controlling each of the first set of electrical devices based on the determined first operational mode and the first timing information;
  - detecting a movement of the first user from the first physical space to a second physical space, wherein the second physical space is associated with a second set of electrical devices;
  - determining a third operational mode, from the first plurality of operational modes, for at least one electrical device of the first set of electrical devices associated with the first physical space, based on the detected movement of the first user from the first physical space;
  - controlling the at least one electrical device of the first set of electrical devices associated with the first physical space, based on the determined third operational mode and the first timing information;
  - controlling a second image capturing device to capture one or more images of an area in the first physical space based on a field-of view (FOV) of the second image capturing device, wherein the first physical space includes the second image capturing device;
  - detecting an image of the first user in the captured one or more images; and
  - detecting the presence of the first user within the first physical space based on the detected image.

16. A control device, comprising:
a memory configured to store first device operational information which indicates a first association between first timing information and a first plurality of operational modes for each of a first set of electrical devices associated with a first physical space; and
control circuitry, coupled with the memory, configured to:
- detect a presence of a first user within the first physical space, wherein the first user is associated with a first electronic apparatus;
- determine, based on the detected presence of the first user within the first physical space and the first timing information, a first operational mode from the first plurality of operational modes for each of the first set of electrical devices associated with the first physical space;
  wherein the first device operational information indicates a second association between mode information and the first plurality of operational modes for each of the first set of electrical devices associated with the first physical space, and wherein the mode information includes a plurality of user profiles associated with the first user;
- receive electronic program guide (EPG) information from a server, wherein the EPG information includes a schedule of media content to be rendered on one of the first set of electrical devices;
- determine a user profile from the plurality of user profiles based on the received EPG information including the schedule of the media content; and
- control each of the first set of electrical devices based on the determined first operational mode and the second association between the determined user profile and the first plurality of operational modes.

* * * * *